(12) United States Patent
Nguyen et al.

(10) Patent No.: US 11,340,660 B2
(45) Date of Patent: May 24, 2022

(54) HINGE STRUCTURE AND FOLDABLE ELECTRONIC APPARATUS INCLUDING THE SAME

(71) Applicant: Samsung Electronics Co., Ltd., Suwon-si (KR)

(72) Inventors: Dinh Quynh Nguyen, Pho Yen town (VN); Danh Tung Tran, Pho Yen town (VN); The Nam Nguyen, Pho Yen town (VN); Hoai Nam Ngo, Pho Yen town (VN); Xuan Truong Dao, Pho Yen town (VN); Khac Cao Nguyen, Pho Yen town (VN); Ha Duy Tran, Pho Yen town (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 17/101,458

(22) Filed: Nov. 23, 2020

(65) Prior Publication Data

US 2021/0247814 A1    Aug. 12, 2021

(30) Foreign Application Priority Data

Feb. 10, 2020    (KR) ........................ 10-2020-0015842

(51) Int. Cl.
*G06F 1/16* (2006.01)
(52) U.S. Cl.
CPC .......... *G06F 1/1681* (2013.01); *G06F 1/1616* (2013.01); *G06F 1/1652* (2013.01)
(58) Field of Classification Search
CPC combination set(s) only.
See application file for complete search history.

(56) References Cited

U.S. PATENT DOCUMENTS 9,047,055 B2    6/2015    Song
9,179,559 B1    11/2015   Kim
(Continued)

FOREIGN PATENT DOCUMENTS

KR    10-0748616 B1    8/2007
KR    2011-0062891 A1    6/2011
(Continued)

OTHER PUBLICATIONS https://interestingengineering.com/the-razr-returns-motorola-confirms-newfoldable-phone, Feb. 28, 2019.
(Continued)

*Primary Examiner* — Lisa Lea-Edmonds
(74) *Attorney, Agent, or Firm* — Jefferson IP Law, LLP

(57) ABSTRACT

A hinge structure of a foldable electronic apparatus is provided. The hinge structure includes a hinge member fixed to each of a first housing member and a second housing member, a rotation support portion rotatably supporting the hinge member and including a rotation guide that guides a rotation of the hinge member, and an angle maintaining structure configured to maintain a position of the hinge member. The first housing member and the second housing members are maintained at a predetermined angle with respect to each other. The angle maintaining structure includes an elastic pressing portion arranged between the rotation guide and the hinge member, the angle maintaining structure extending along a rotation direction of the hinge member, and being elastically deformable, and at least one position maintaining groove into which a portion of the elastic pressing portion is insertable and which is formed in a surface of the hinge member opposite to the rotation guide.

17 Claims, 26 Drawing Sheets

(56) References Cited

U.S. PATENT DOCUMENTS

| | | | |
|---|---|---|---|
| 11,231,754 B2* | 1/2022 | Kang | H04M 1/022 |
| 2013/0002114 A1 | 1/2013 | Hamers et al. | |
| 2013/0044422 A1 | 2/2013 | Li et al. | |
| 2021/0243908 A1 | 8/2021 | Park et al. | |
| 2021/0247814 A1* | 8/2021 | Nguyen | H04M 1/022 |
| 2021/0303033 A1* | 9/2021 | Hong | G06F 1/1656 |
| 2021/0392213 A1* | 12/2021 | Kim | H04M 1/022 |
| 2022/0011827 A1* | 1/2022 | Kim | G06F 1/1681 |

FOREIGN PATENT DOCUMENTS

| | | |
|---|---|---|
| KR | 2011-0062892 A | 6/2011 |
| KR | 10-2016-0027626 A | 3/2016 |
| KR | 10-1744788 B1 | 6/2017 |
| KR | 10-2019-0124110 A | 11/2019 |

OTHER PUBLICATIONS https://www.firstpost.com/tech/news-analysis/apple-patent-application-indicatesfuture-iphones-might-get-foldable-design-6105201.html, Feb. 18, 2019.
https://wiser.my/reka-bentuk-konsep-iphone-boleh-lipat-didedahkan-tampilberbeza-dari-model-samsung/, Feb. 20, 2019.
International Search Report dated Feb. 24, 2021, issued in International Application No. PCT/KR2020/016631.

\* cited by examiner

HINGE STRUCTURE AND FOLDABLE ELECTRONIC APPARATUS INCLUDING THE SAME

CROSS-REFERENCE TO RELATED APPLICATION(S)

This application is based on and claims priority under 35 U.S.C. § 119 of a Korean patent application number 10-2020-0015842, filed on Feb. 10, 2020, in the Korean Intellectual Property Office, the disclosure of which is incorporated by reference herein in its entirety.

BACKGROUND

1. Field

The disclosure relates to a hinge structure and a foldable electronic apparatus including the same.

2. Description of Related Art

With the advancement of digital technology, various types of electronic apparatus such as mobile communication terminals, smart phones, tablet personal computers (PCs), personal digital assistants (PDAs), electronic notebooks, notebooks, wearable devices, and the like have been widely used.

Recently, electronic apparatuses with improved portability due to a foldable structure that allows the electronic apparatuses to be folded to have a smaller size have been released. Such a foldable electronic apparatus may have two housing members connected to each other by using a foldable hinge structure.

The hinge structure supports the foldable electronic apparatus to be folded inward or outward.

The above information is presented as background information only to assist with an understanding of the disclosure. No determination has been made, and no assertion is made, as to whether any of the above might be applicable as prior art with regard to the disclosure.

SUMMARY

However, such a hinge structure only can keep the foldable electronic apparatus fully folded or fully unfolded, and does not include a standing structure for maintaining the foldable electronic apparatus at various angles.

Aspects of the disclosure are to address at least the above-mentioned problems and/or disadvantages and to provide at least the advantages described below. Accordingly, an aspect of the disclosure is to provide a hinge structure with small width and high durability and capable of supporting a housing of a foldable electronic apparatus at various angles, and the foldable electronic apparatus including the hinge structure.

Another aspect of the disclosure is to provide a hinge structure having a reduced weight while securing a space for other components, and the foldable electronic apparatus including the hinge structure.

Additional aspects will be set forth in part in the description which follows and, in part, will be apparent from the description, or may be learned by practice of the presented embodiments of the disclosure.

In accordance with an aspect of the disclosure, a foldable electronic apparatus is provided. The apparatus includes first housing member and a second housing member spaced apart from each other by a predetermined distance, a flexible display supported by the first housing member and the second housing member, and a hinge structure connecting the first housing member and the second housing member to each other. The hinge structure includes a hinge member fixed to each of the first housing member and the second housing member, a rotation support portion rotatably supporting the hinge member and including a rotation guide that guides a rotation of the hinge member, and an angle maintaining structure configured to maintain a position of the hinge member to allow the first housing member and the second housing member to be maintained at a predetermined angle with respect to each other. The angle maintaining structure includes an elastic pressing portion arranged between the rotation guide and the hinge member. the elastic pressing portion extending along a rotation direction of the hinge member, and elastic deformable, and at least one position maintaining groove into which a portion of the elastic pressing portion is insertable and which is disposed in a surface of the hinge member facing the rotation guide.

The angle maintaining structure may be further configured to maintain a position of the hinge member so as to allow the first and second housing members to be maintained at an angle greater than 0 degree and less than 180 degrees.

The elastic pressing portion may include a position maintaining protrusion which is insertable into the position maintaining groove, and an elastic portion supporting the position maintaining protrusion and providing an elastic force so that the position maintaining protrusion is inserted into the position maintaining groove.

A height of the position maintaining protrusion may be less than or equal to a depth of the position maintaining groove.

A sliding groove into which the position maintaining protrusion is insertable and which extends along a rotation direction may be disposed in one side of the position maintaining groove in the hinge member.

A depth of the sliding groove may be greater than or equal to a depth of the position maintaining groove.

The elastic portion may include a fixing portion fixed to the rotation guide, and a deformation portion supporting the position maintaining protrusion, having a length extending along a rotation direction of the hinge member, and being elastically deformed in a direction perpendicular to a lengthwise direction.

The elastic portion may further include a plurality of support portions for supporting the deformation portion to be spaced apart from the rotation guide by a predetermined interval.

The elastic portion may further include a plurality of auxiliary support portions arranged between the plurality of support portions at opposite sides of the position maintaining protrusion and include a height less than the heights of the plurality of support portions.

The deformation portion may further include a pair of slits formed between the position maintaining protrusion and the plurality of auxiliary support portions.

The deformation portion may extend from the fixing portion, and include a structure in which a distance from a surface of the rotation guide increases as the deformation portion approaches the position maintaining protrusion.

The position maintaining protrusion may include a material identical to a material of the elastic portion.

The position maintaining protrusion may include a material different from a material of the elastic portion.

The hinge member may include a sliding rotation portion having a shape corresponding to a shape of the rotation guide.

The hinge member is a pair of hinge members, the pair of hinge members may rotate about parallel axes of rotation, respectively.

In accordance with another aspect of the disclosure, a hinge structure of a foldable electronic apparatus connects a first housing member and a second housing member supporting a flexible display to each other. The hinge structure includes a hinge member fixed to the first housing member and the second housing member, a rotation support portion rotatably supporting the hinge member and including a rotation guide that guides a rotation of the hinge member, and an angle maintaining structure configured to maintain a position of the hinge member. The first housing member and the second housing member are maintained at a predetermined angle with respect to each other. The angle maintaining structure includes an elastic pressing portion arranged between the rotation guide and the hinge member, the elastic pressing portion extending along a rotation direction of the hinge member, and being elastically deformable, and at least one position maintaining groove into which a portion of the elastic pressing portion is insertable and which is disposed in a surface of the hinge member facing the rotation guide.

The angle maintaining structure may be further configured to maintain a position of the hinge member, so as to allow the first and second housing members to be maintained at an angle greater than 0 degree and less than 180 degrees.

A sliding groove into which the position maintaining protrusion is insertable and which extends along a rotation direction may be formed in one side of the position maintaining groove in the hinge member.

The elastic portion may further include a fixing portion fixed to the rotation guide, a deformation portion supporting the position maintaining protrusion, the deformation portion including a length extending along a rotation direction of the hinge member, the deformation portion being elastically deformable in a direction perpendicular a lengthwise direction, and a plurality of support portions for supporting the deformation portion to be spaced apart from the rotation guide by a predetermined interval.

The elastic portion may further include a plurality of auxiliary support portions arranged at opposite sides of the position maintaining protrusion between the plurality of support portions, the plurality of auxiliary support portions includes a height less than a height of the plurality of support portions, and the deformation portion may further include a pair of slits formed between the position maintaining protrusion and the plurality of auxiliary support portions.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
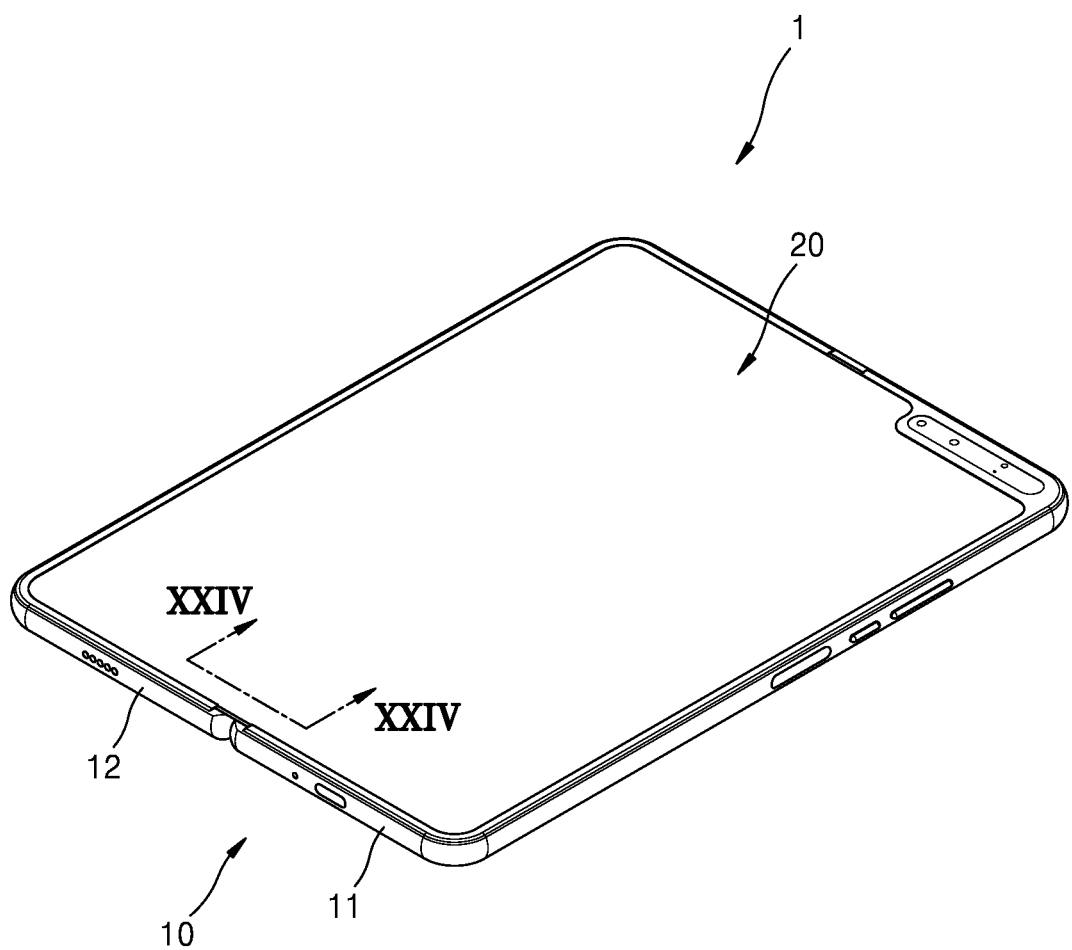
FIG. 1 is an assembled perspective view illustrating a foldable electronic apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Regarding terms used in the disclosure, general terms that are currently widely used have been selected in consideration of functions in the disclosure, but this may vary depending on the intention or precedent of a technician working in the field, the emergence of new technologies, and the like. In addition, in certain cases, some terms are arbitrarily selected by the applicant, and in this case, their meanings will be described in detail in the applicable written description. Therefore, the terms used in the disclosure should not be interpreted only by the name of the terms, but should be defined based on the meaning of the terms and contents throughout the disclosure.

Throughout the specification, when a part is described to "include" a certain component, this means that other components may be further included rather than excluding other components, unless otherwise specified.

In addition, terms such as "first" and "second" are not used in a limited sense, but for the purpose of distinguishing one component from other components.

Throughout the disclosure, the expression "at least one of a, b or c" indicates only a, only b, only c, both a and b, both a and c, both b and c, all of a, b, and c, or variations thereof.

As used herein, "about" or "approximately" includes the stated value and is within the range of allowable deviations for a particular value determined by a person of skill in the art taking into account the errors associated with the measurement of a particular quantity (e.g., limits of the measurement system). For example, "about" may mean within one or more standard deviations or within ±10%, or within ±5% of a specified value.

Hereinafter, embodiments of the disclosure will be described in detail with reference to the accompanying drawings so that one of ordinary skill in the art to which the disclosure pertains can implement the embodiments without any difficulty. However, the disclosure may be implemented in various different forms and is not limited to the embodiments described herein. In addition, in order to clearly describe the disclosure, parts irrelevant to the description are omitted in the drawings, and like reference numerals denote like elements throughout the specification.

FIG. 1 is an assembled perspective view illustrating a foldable electronic apparatus 1 according to an embodiment of the disclosure.

Figure 2:
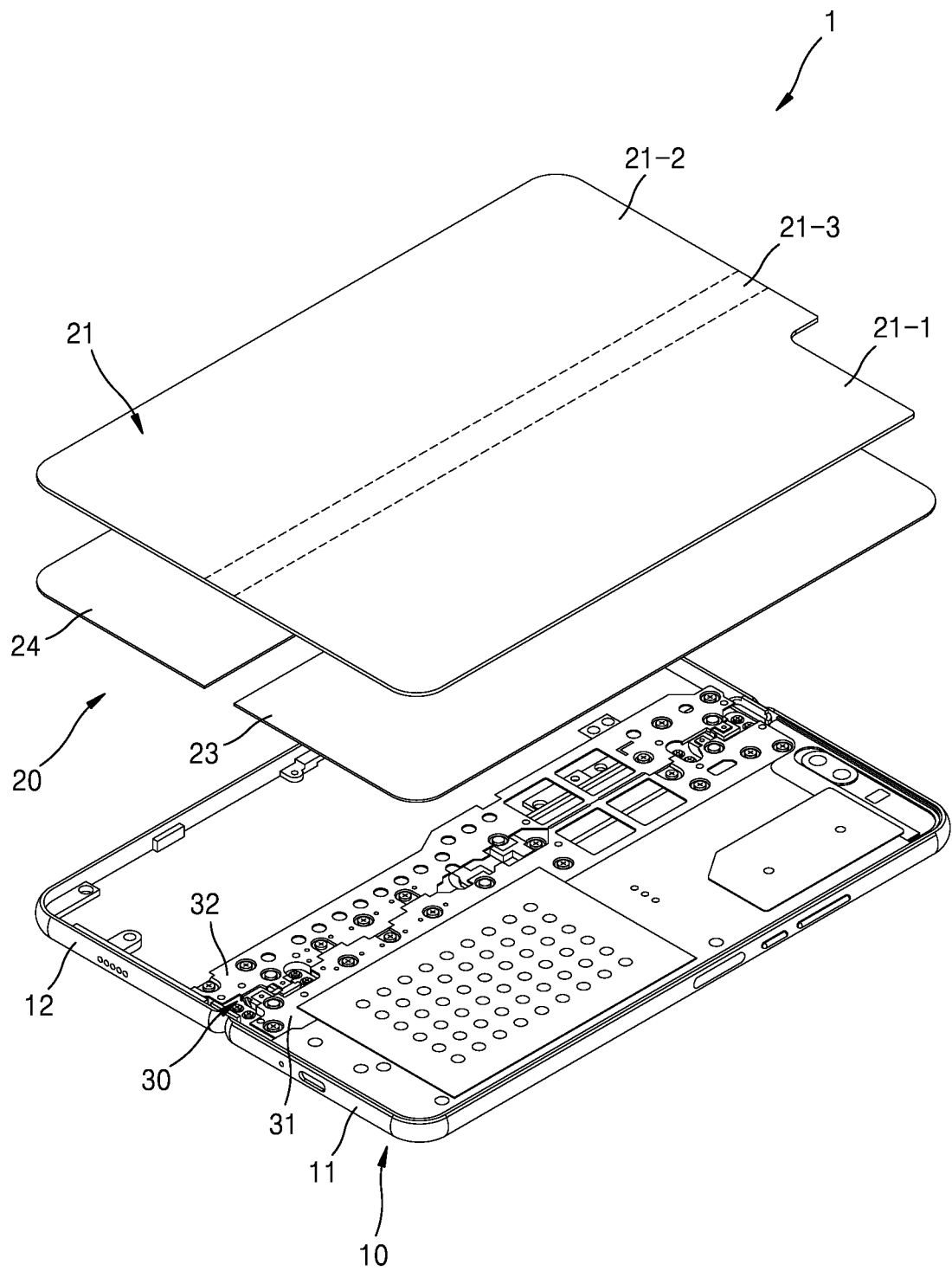
FIG. 2 is an exploded perspective view illustrating the foldable electronic apparatus according to an embodiment of the disclosure.

FIG. 2 is an exploded perspective view illustrating the foldable electronic apparatus 1 according to an embodiment of the disclosure.

Referring to FIGS. 1 and 2, the foldable electronic apparatus 1 includes a housing 10, a flexible display module 20 (e.g., a flexible display), and a hinge structure 30. The foldable electronic apparatus 1 may be referred to as a flexible electronic apparatus, a flexible display apparatus, an electronic apparatus, or a display apparatus.

The housing 10 defines at least a portion of the exterior of the foldable electronic apparatus 1, and defines a space for accommodating and protecting electronic components such as a printed circuit board (PCB), battery, or the like.

The housing 10 includes a plurality of housing members. For example, the housing 10 includes a first housing member 11 and a second housing member 12.

The first housing member 11 and the second housing member 12 may have symmetrical shapes, but are not necessarily limited thereto. For example, the first and second housing members 11 and 12 may have different shapes.

The first housing member 11 and the second housing member 12 are rotatably connected by using the hinge structure 30. The positions of the first housing member 11 and the second housing member 12 may be changed between unfolded and folded positions.

Here, the unfolded position may refer to a position in which the first housing member 11 and the second housing member 12 are fully unfolded, for example, a position in which an angle formed by the first housing member 11 and the second housing member 12 is about 180 degrees, and the folded position may refer to a position in which the first housing member 11 and the second housing member 12 are completely folded, for example, a position in which an angle between the first housing member 11 and the second housing member 12 is about 0 degree.

The flexible display module 20 includes a flexible display panel 21 for displaying an image and first and second support plates 23 and 24 for supporting the flexible display panel 21. Although not shown, the flexible display module 20 may further include a transparent protective panel outside the flexible display panel 21.

The first support plate 23 is above the first housing member 11, and the second support plate 24 is above the second housing member 12. The first and second support plates 23 and 24 may have the same shape and may be placed symmetrically. However, the shapes of the first and second support plates 23 and 24 are not necessarily limited thereto, and may be other shapes as necessary.

The flexible display module 20 may be supported by the first housing member 11 and the second housing member 12. For example, the first support plate 23 and the second support plate 24 of the flexible display module 20 may be supported by the first housing member 11 and the second housing member 12 by an adhesive (not shown) such as an adhesive or double-sided tape, a bonding material, or the like.

Figure 4:
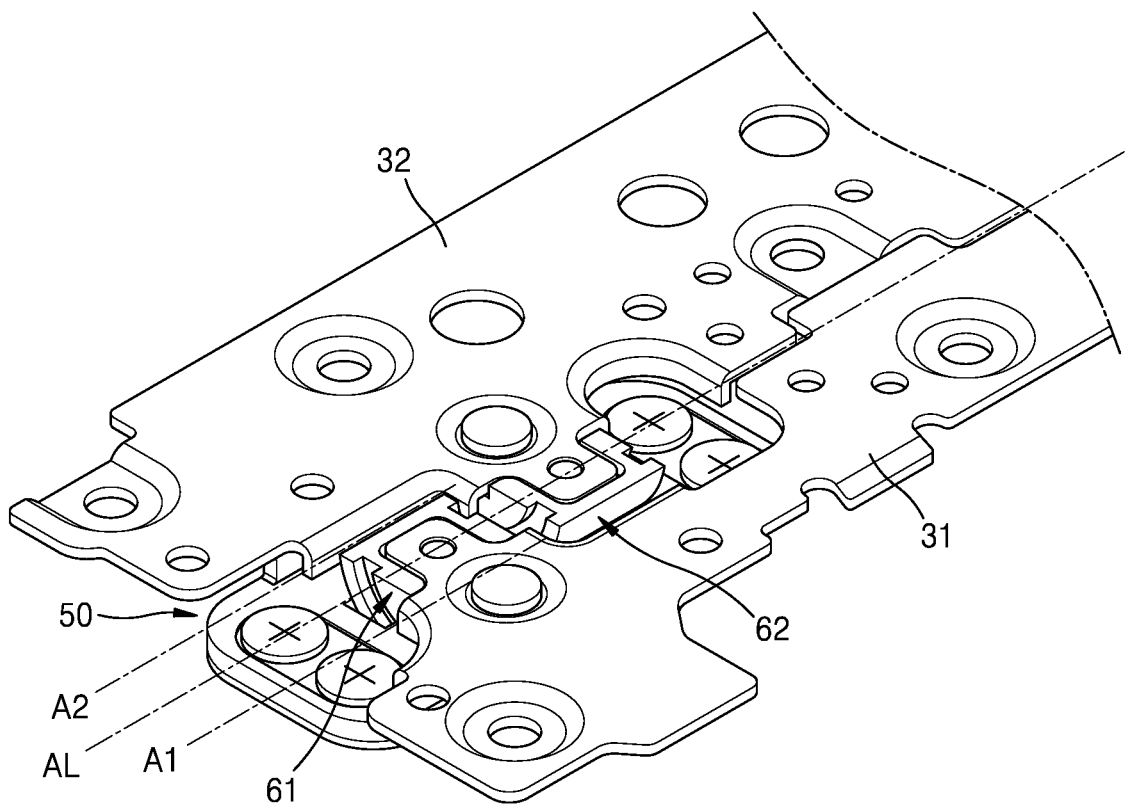
FIG. 4 is a diagram illustrating a state in which a connection member is coupled to a hinge member in the hinge structure of FIG. 3 according to an embodiment of the disclosure.

As the first and second housing members 11 and 12 are changed between the unfolded position and the folded position, the flexible display module 20 supported by the first and second housing members 11 and 12 may be folded along a virtual center line AL (see FIG. 4).

The flexible display panel 21 may be divided into a first support area 21-1 supported by the first housing member 11, a second support area 21-2 supported by the second housing member 12, and a bendable area 21-3 between the first support area 21-1 and the second support area 21-2. The bendable area 21-3 is not attached by the first and second housing members 11 and 12.

At least a portion of the hinge structure 30 is placed under the bendable area 21-3 of the flexible display panel 21. The hinge structure 30 connects the first housing member 11 to the second housing member 12 to each other and rotatably supports the first housing member 11 and the second housing member 12.

A portion of the hinge structure 30 is connected to the first housing member 11, and the other portion may be connected to the second housing member 12. For example, the hinge structure 30 may be connected to the first housing member 11 by using a first connection member 31, and may be connected to the second housing member 12 by using a second connection member 32.

Figure 3:
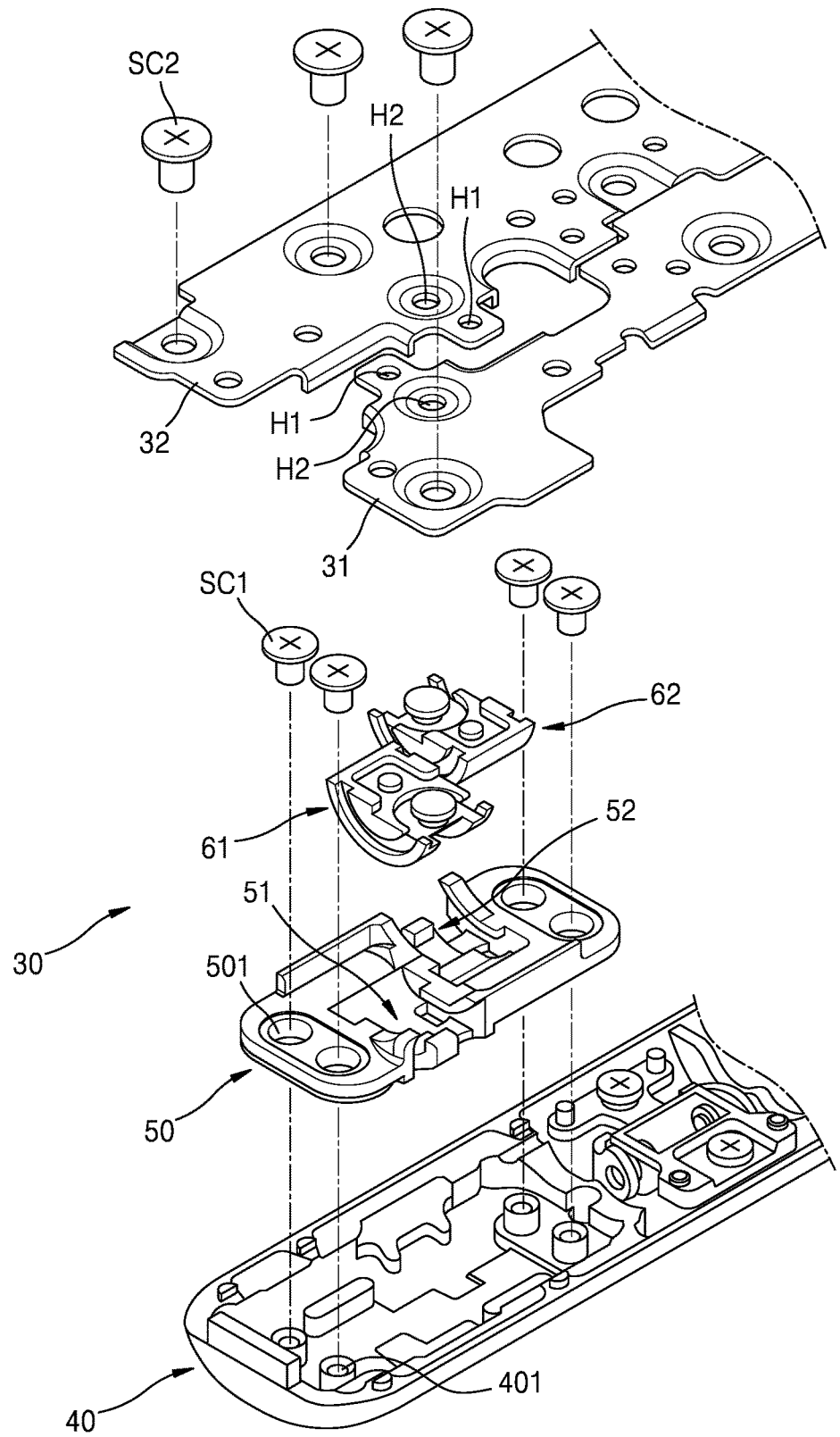
FIG. 3 is an exploded perspective view illustrating a portion of a hinge structure according to an embodiment of the disclosure.
Figure 5:
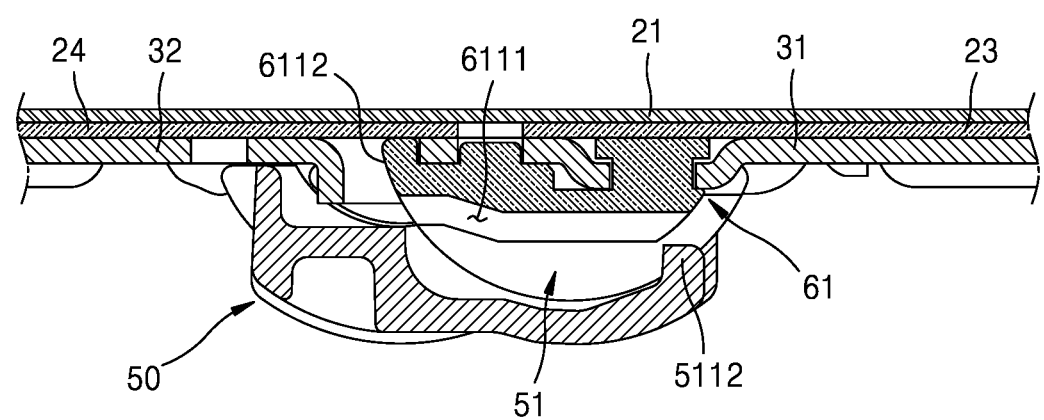
FIG. 5 is a cross-sectional view illustrating a first hinge member and a peripheral configuration thereof in the hinge structure of FIG. 3 according to an embodiment of the disclosure.
Figure 6:
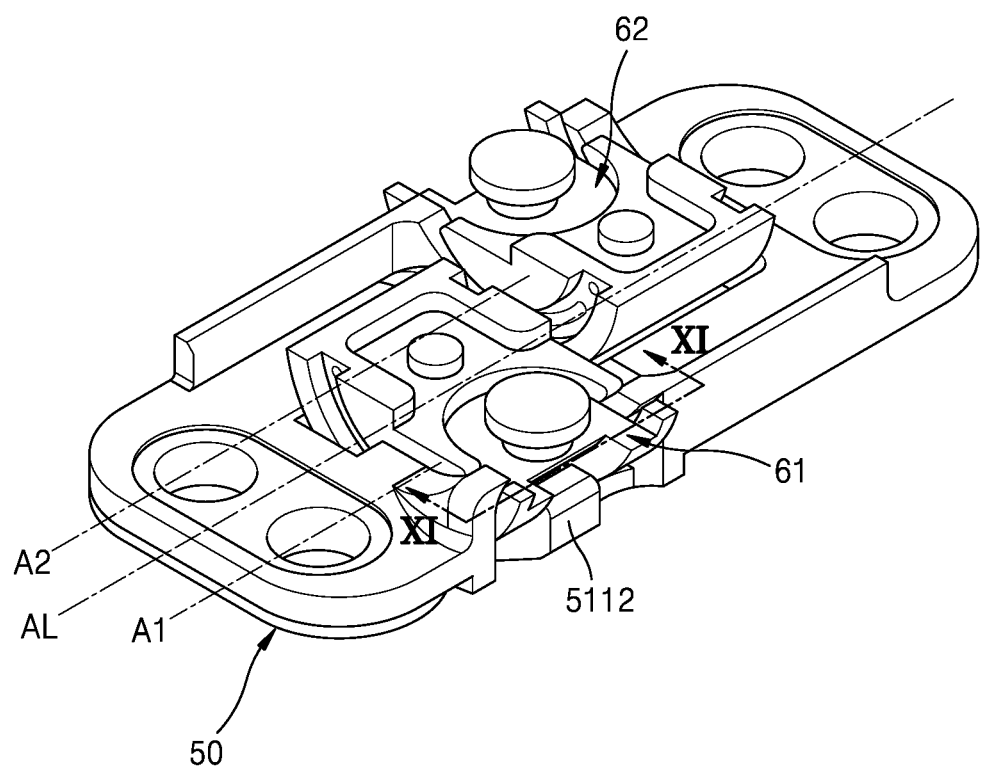
FIG. 6 is a diagram illustrating a state in which first and second hinge members are coupled to a bracket member in the hinge structure of FIG. 3 according to an embodiment of the disclosure.
Figure 7:
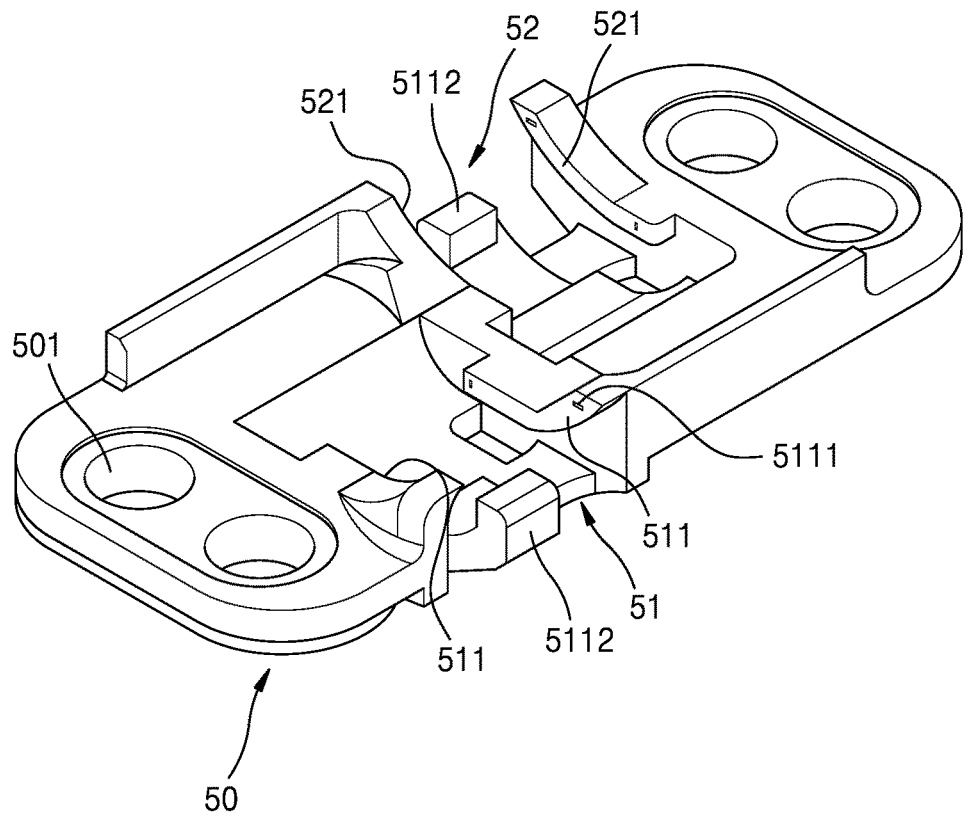
FIG. 7 is a perspective view illustrating the bracket member according to an embodiment of the disclosure.
Figure 8:
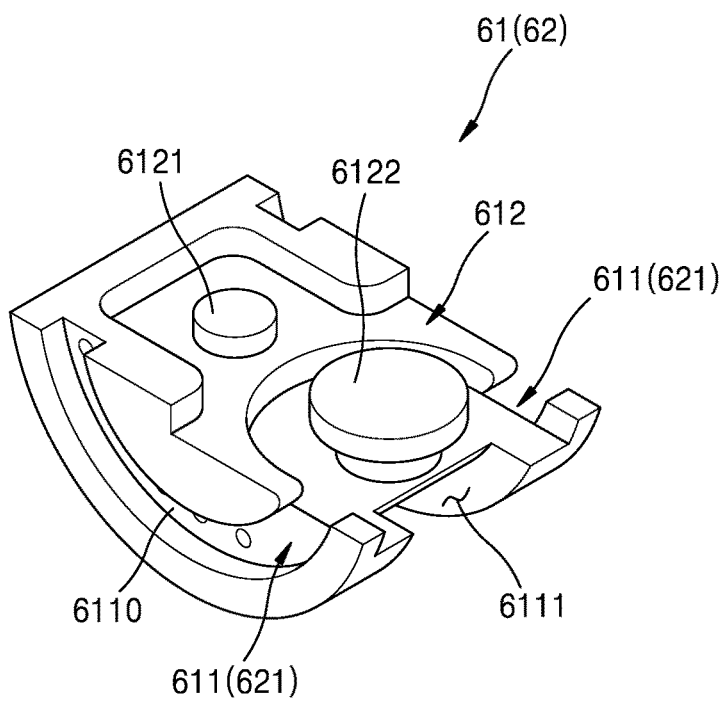
FIG. 8 is a perspective view illustrating the hinge member according to an embodiment of the disclosure.

FIG. 3 is an exploded perspective view illustrating a portion of the hinge structure 30 according to an embodiment of the disclosure. FIG. 4 is a diagram illustrating a state in which the connection members 31 and 32 are coupled to hinge members 61 and 62 in the hinge structure 30 of FIG. 3 according to an embodiment of the disclosure, and FIG. 5 is a cross-sectional view illustrating a first hinge member 61 and a peripheral configuration thereof according to an embodiment of the disclosure. FIG. 6 is a diagram illustrating a state in which the first and second hinge members 61 and 62 are coupled to a bracket member 50 in the hinge structure 30 of FIG. 3 according to an embodiment of the disclosure. FIG. 7 is a perspective view illustrating the bracket member 50 according to the embodiment of the disclosure. FIG. 8 is a perspective view illustrating a hinge member according to an embodiment of the disclosure.

Referring to FIGS. 3 to 5, the hinge structure 30 includes a cover member 40, the bracket member 50, and a pair of hinge members 61 and 62.

The cover member 40 prevents the bracket member 50 and the first and second hinge members 61 and 62 of the hinge structure 30 from being exposed to the outside, and covers the bottom portion of the bendable area 21-3 of the flexible display panel 21.

The cover member 40 includes an outer surface exposed to the outside and an inner surface located on the opposite side of the outer surface.

The outer surface forms a portion of the exterior of the foldable electronic apparatus 1, and includes a flat or curved surface. For example, the middle portion of the outer surface may be a flat surface, and the opposite side portions of the outer surface may be a curved surface gently extending into a flat surface.

The inner surface may form various inner protrusions to fasten the bracket member 50 and other modules or the like.

However, the outer surface and the inner surface are not limited thereto, and may have different shapes according to the purpose and function thereof.

The cover member 40 may include a metal, for example, aluminum, stainless steel, or magnesium. However, the material of the cover member 40 is not limited thereto, and other materials such as plastic may be used.

The bracket member 50 is placed on the inner surface of the cover member 40. The number of bracket members 50 may be adjusted according to a function of the hinge structure 30.

The bracket member 50 may be fixed to the cover member 40. For example, the bracket member 50 and the cover member 40 are separate bodies manufactured individually as shown in FIG. 3, the bracket member 50 includes a fastening hole 501, and the cover member 40 may include a hole structure 401 that may be inserted into the fastening hole 501. In the state that the hole structure 401 of the cover member 40 is inserted into the fastening hole 501 of the bracket member 50, when a fixing member SC1 is coupled to the hole structure 401, the bracket member 50 may be fixed to the cover member 40.

However, the configuration and fixing method of the bracket member 50 and the cover member 40 are not limited thereto, and may be modified in various ways. For example, although not shown, the bracket member 50 and the cover member 40 may be a single body.

The bracket member 50 may include a first rotation support portion 51 and a second rotation support portion 52, the first rotation support portion 51 supporting the first hinge member 61 to be rotatable about a first rotation axis A1 and the second rotation support portion 52 supporting the second hinge member 62 to be rotatable about a second rotation axis A2. The second rotation axis A2 is parallel to the first rotation axis A1.

Referring to FIGS. 3 to 8, the first and second rotation support portions 51 and 52 may include recessed structures into which at least a portion of the first and second hinge members 61 and 62 is inserted. The shapes of the recessed structures of the first and second rotation support portions 51 and 52 may be semi-circular or elliptical.

The shape of the recessed structure of the first rotation support portion 51 may correspond to an outer shape of the first hinge member 61. The shape of the recessed structure of the second rotation support portion 52 may correspond to the outer shape of the second hinge member 62.

The first rotation support portion 51 includes a first rotation guide 511 for guiding the rotation of the first hinge member 61.

The first rotation guide 511 may have a structure protruding toward the first hinge member 61 and extending along the rotation direction. For example, the first rotation guide 511 may be formed in a curved shape with a predetermined radius. The first rotation guide 511 may have an arc shape.

However, the structure of the first rotation guide 511 is not limited to thereto, and may be modified in various ways. For example, although not shown, the first rotation guide 511 may be a concave structure rather than a protruding structure, or may be a structure including a plurality of small protrusions arranged along the rotation direction rather than a single structure extending along the rotation direction.

The first rotation guide 511 may be plural. For example, there may be two first rotation guides 511. The two first rotation guides 511 may be arranged spaced apart along the extension direction of the first rotation axis A1. By using two first rotation guides 511, the first hinge member 61 may stably rotate about the first rotation axis A1.

The second rotation support portion 52 includes a second rotation guide 521 for guiding the rotation of the second hinge member 62.

The second rotation guide 521 may have a structure protruding toward the second hinge member 62 and extending along the rotation direction of the second hinge member 62. For example, the second rotation guide 521 may be formed in a curved shape with a predetermined radius. The second rotation guide 521 may have an arc shape.

However, the structure of the second rotation guide 521 is not limited to thereto, and may be modified in various ways. For example, although not shown, the second rotation guide 521 may have a concave structure rather than a protruding structure, or may have a structure including a plurality of small protrusions arranged along the rotation direction rather than a single structure extending along the rotation direction.

The second rotation guide 521 may be plural. For example, there may be two second rotation guides 521. The two second rotation guides 521 may be arranged spaced apart along the extending direction of the second rotation axis A2. By using two second rotation guides 521, the second hinge member 62 may stably rotate about the second rotation axis A2.

The first hinge member 61 includes a first sliding rotation portion 611 that slides with respect to the first rotation guide 511.

The first sliding rotation portion 611 may have a shape corresponding to the shape of the first rotation guide 511. For example, the first sliding rotation portion 611 may be a groove structure recessed inward to provide a space into which the first rotation guide 511 is inserted. The groove structure may extend along the direction of rotation.

However, the structure of the first sliding rotation portion 611 is not limited thereto, and may change as the shape of the first rotation guide 511 changes. For example, when the first rotation guide 511 has a groove structure, the first sliding rotation portion 611 may have a protruding structure to be inserted into that groove structure.

The first sliding rotation portion 611 contacts the first rotation guide 511 and rotates along the shape of the first rotation guide 511. Accordingly, the first hinge member 61 rotates constantly about the first rotation axis A1.

The second hinge member 62 includes a second sliding rotation portion 621 that slides with respect to the second rotation guide 521.

The second sliding rotation portion 621 may have a shape corresponding to the shape of the second rotation guide 521. For example, the second sliding rotation portion 621 may have a groove structure recessed inward to provide a space into which the second rotation guide 521 is inserted. The groove structure may extend along the direction of rotation.

However, the structure of the second sliding rotation portion 621 is not limited thereto, and may change as the shape of the second rotation guide 521 changes. For example, when the second rotation guide 521 has a groove structure, the second sliding rotation portion 621 may have a protruding structure to be inserted into the groove structure.

The second sliding rotation portion 621 contacts the second rotation guide 521 and rotates along the shape of the second rotation guide 521. Accordingly, the second hinge member 62 rotates constantly about the second rotation axis A2.

As above, as the first hinge member 61 rotates about the first rotation axis A1 and the second hinge member 62 rotates about the second rotation axis A2, the first and second housing members 11 and 12 connected to each other by using the hinge structure 30 may be foldable along an virtual center line AL formed between the first rotation axis A1 and the second rotation axis A2.

Referring to FIGS. 5 to 8, the bracket member 50 may include a stopper portion 5112 for limiting a rotation angle range of each of the first and second hinge members 61 and 62.

The stopper portion 5112 is located within the rotation radius of the first and second hinge members 61 and 62. For example, the stopper portion 5112 may be a structure protruding from the first and second rotation support portions 51 and 52.

The stopper portion 5112 may include a rotation limiting groove 6111 into which the stopper portion 5112 may be inserted and which extends along the rotation direction, and a rotation limiting protrusion 6112 protruding from one end portion of the rotation limiting groove 6111.

While the first and second hinge members 61 and 62 rotate within a preset angular range, the stopper portion 5112 is located within the rotation limiting groove 6111 and does not interfere with the rotation of the first and second hinge members 61 and 62. When the first and second hinge members 61 and 62 rotate and reach a preset angle, the stopper portion 5112 contacts the rotation limiting protrusion 6112, limiting the rotation of the first and second hinge members 61 and 62. Accordingly, the first and second hinge members 61 and 62 may be prevented from rotating beyond a predetermined rotation range.

For example, the stopper portion 5112 may prevent the first and second hinge members 61 and 62 from rotating beyond the predetermined rotation range when the first and second housing members 11 and 12 are in a folded position. Accordingly, damage to the flexible display panel 21 may be prevented.

Each of the first and second hinge members 61 and 62 may include a receiving portion 612 arranged on the upper surface thereof. The receiving portion 612 accommodates a portion of the first and second connection members 31 and 32, and includes a pin guide 6121 and a fastening portion 6122. The pin guide 6121 and the fastening portion 6122 are respectively inserted into holes H1 and H2 formed in each of the first and second connection members 31 and 32. Accordingly, the first and second hinge members 61 and 62 may be fixed to the first and second connection members 31 and 32, respectively.

The first and second connection members 31 and 32 may be fixed to first and second housing members 11 and 12, respectively. For example, the first and second connection members 31 and 32 may be fixed to the first and second housing members 11 and 12, respectively, by using a fastening member SC2.

Figure 9:
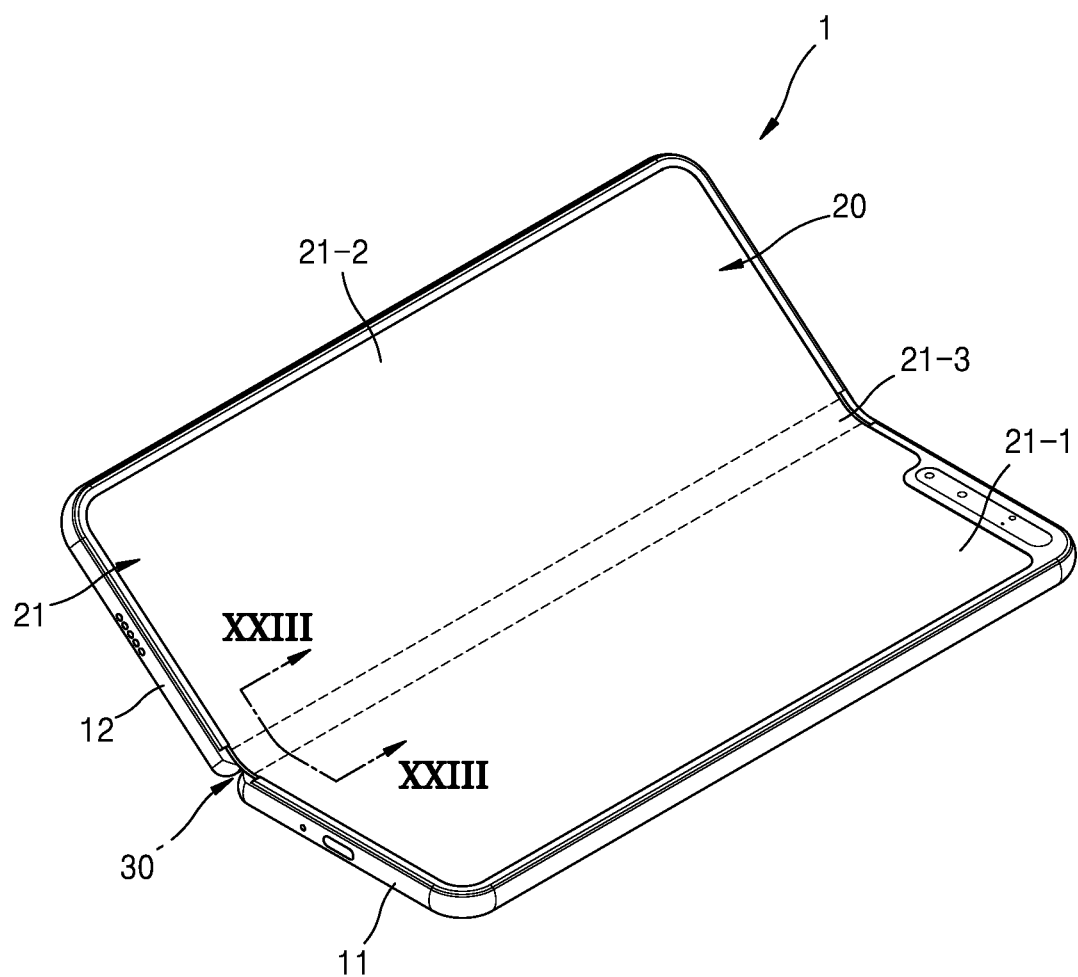
FIG. 9 is a diagram illustrating an operating state of a foldable display apparatus according to an embodiment of the disclosure.
Figure 10:
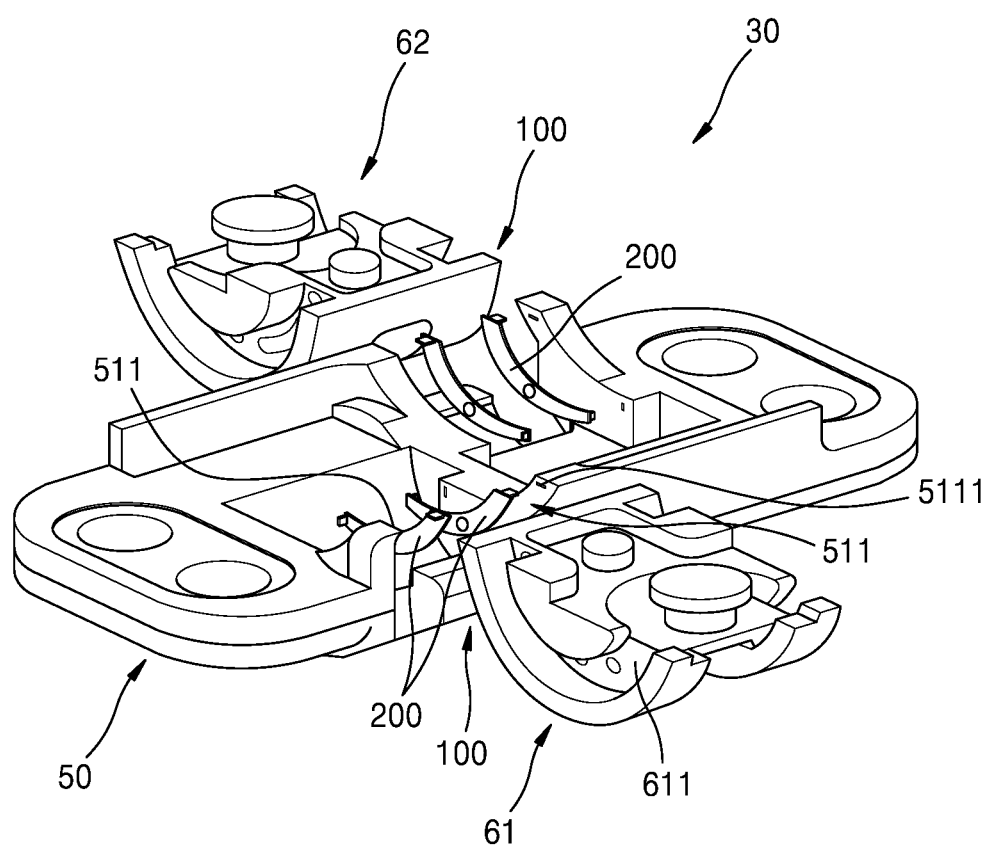
FIG. 10 is an exploded perspective view illustrating an elastic pressing portion between a bracket member and first and second hinge members in a hinge structure, according to an embodiment of the disclosure.
Figure 11:
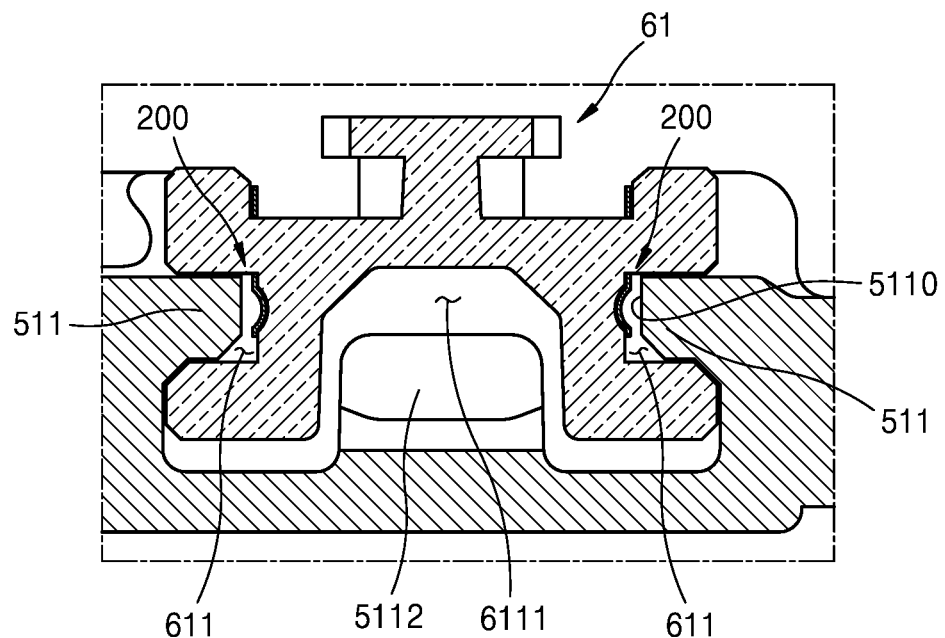
FIG. 11 is cross-sectional view illustrating the elastic pressing portion between the bracket member and the first and second hinge members in a hinge structure, according to an embodiment of the disclosure.
Figure 12:
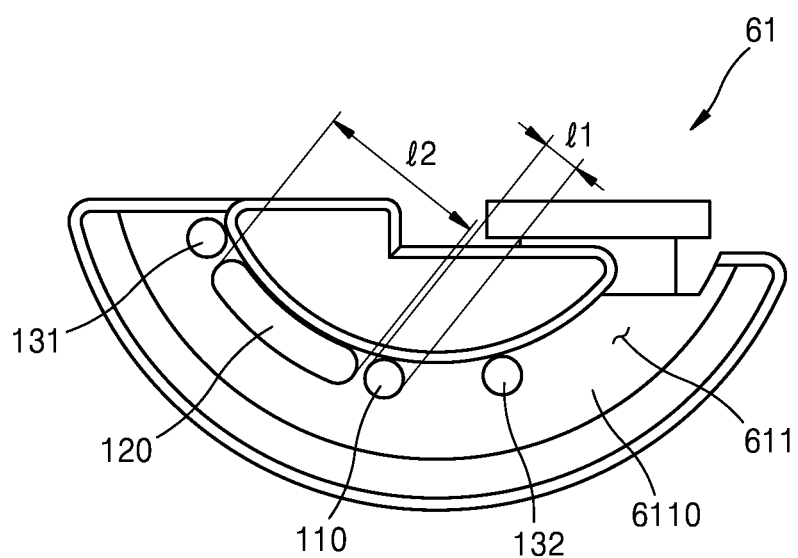
FIG. 12 is a side view of a hinge member according to an embodiment of the disclosure.
Figure 13:
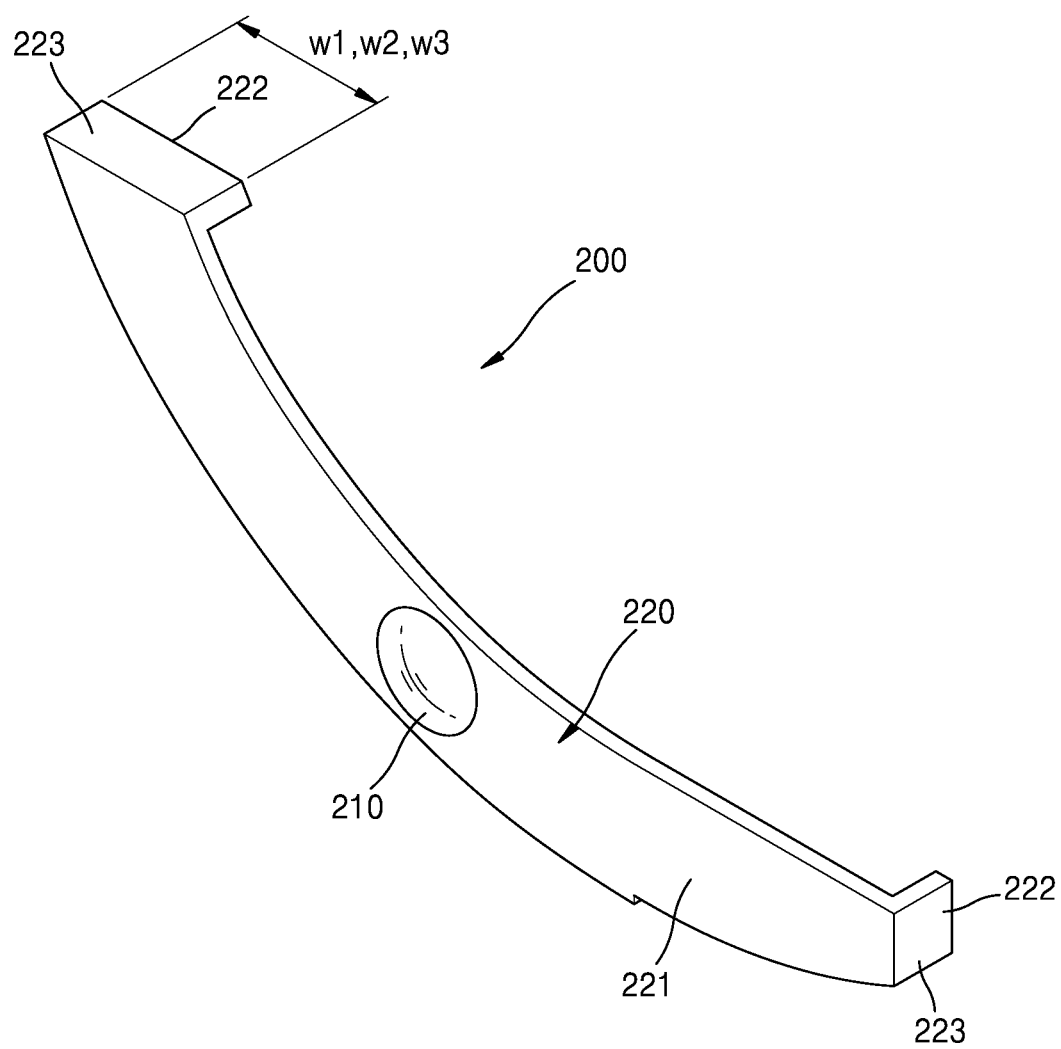
FIG. 13 is a perspective view illustrating an elastic pressing portion according to an embodiment of the disclosure.
Figure 14:
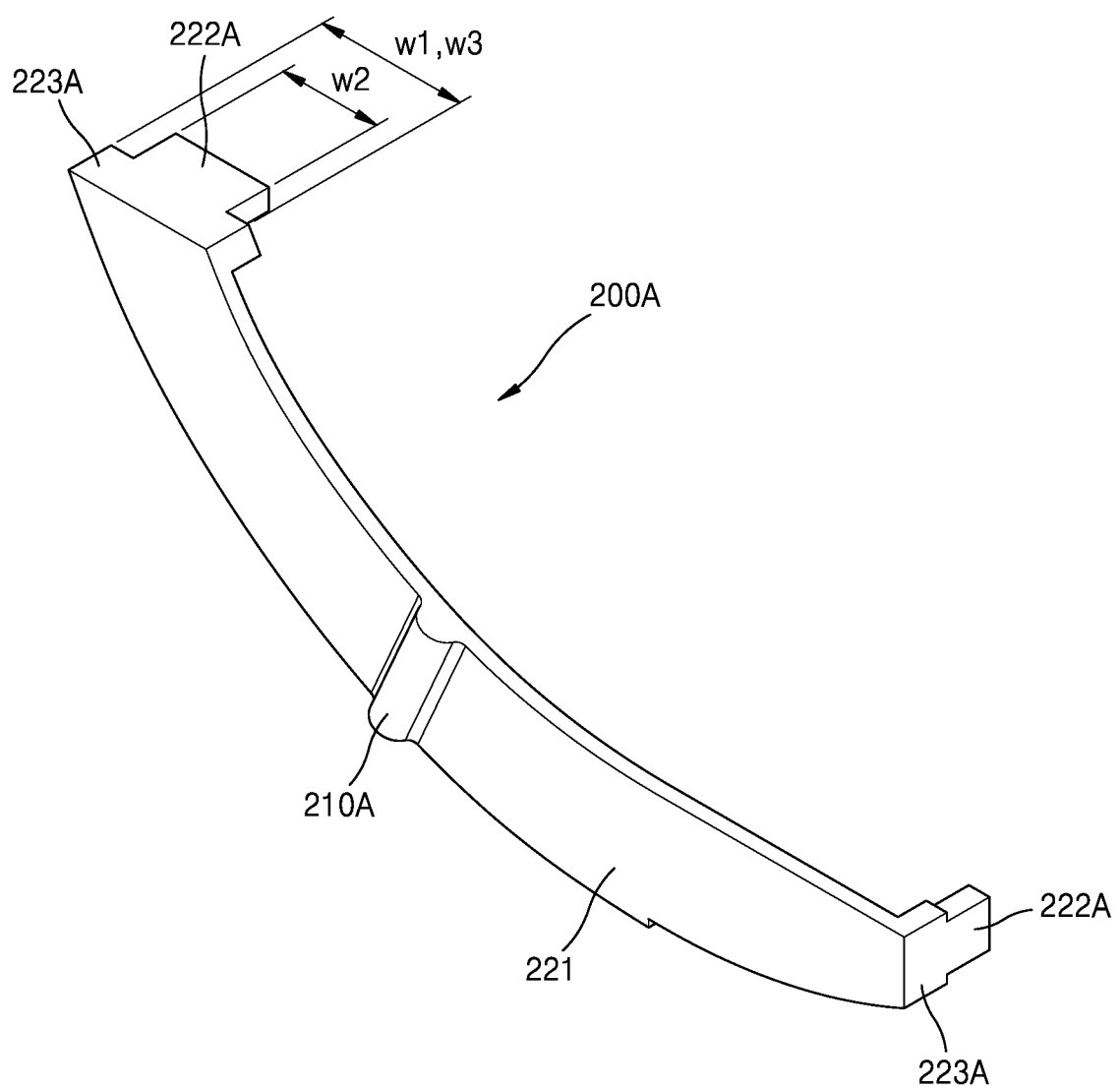
FIG. 14 is a perspective view illustrating an elastic pressing portion according to an embodiment of the disclosure.
Figure 15:
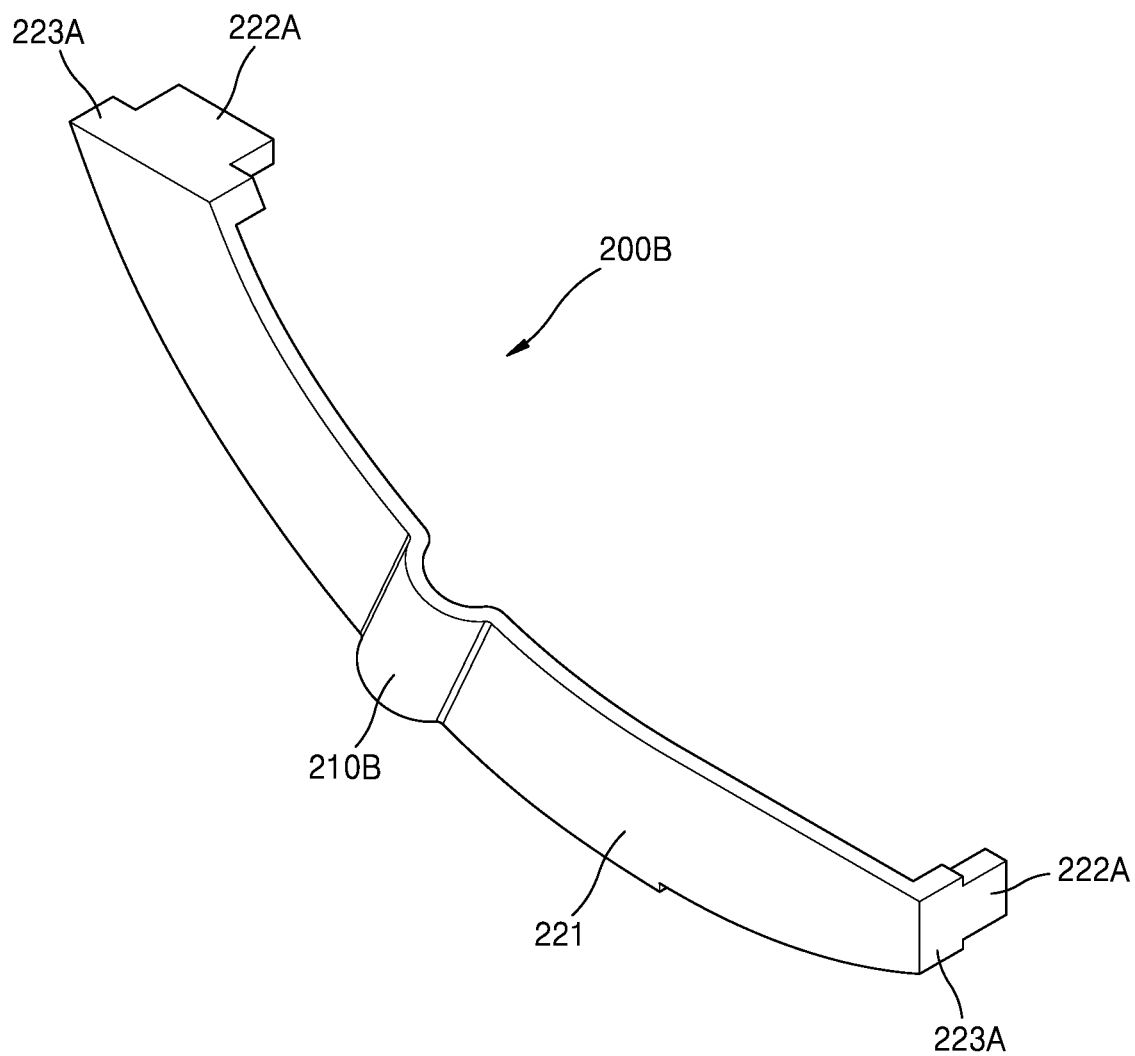
FIG. 15 is a perspective view illustrating an elastic pressing portion according to an embodiment of the disclosure.
Figure 16:
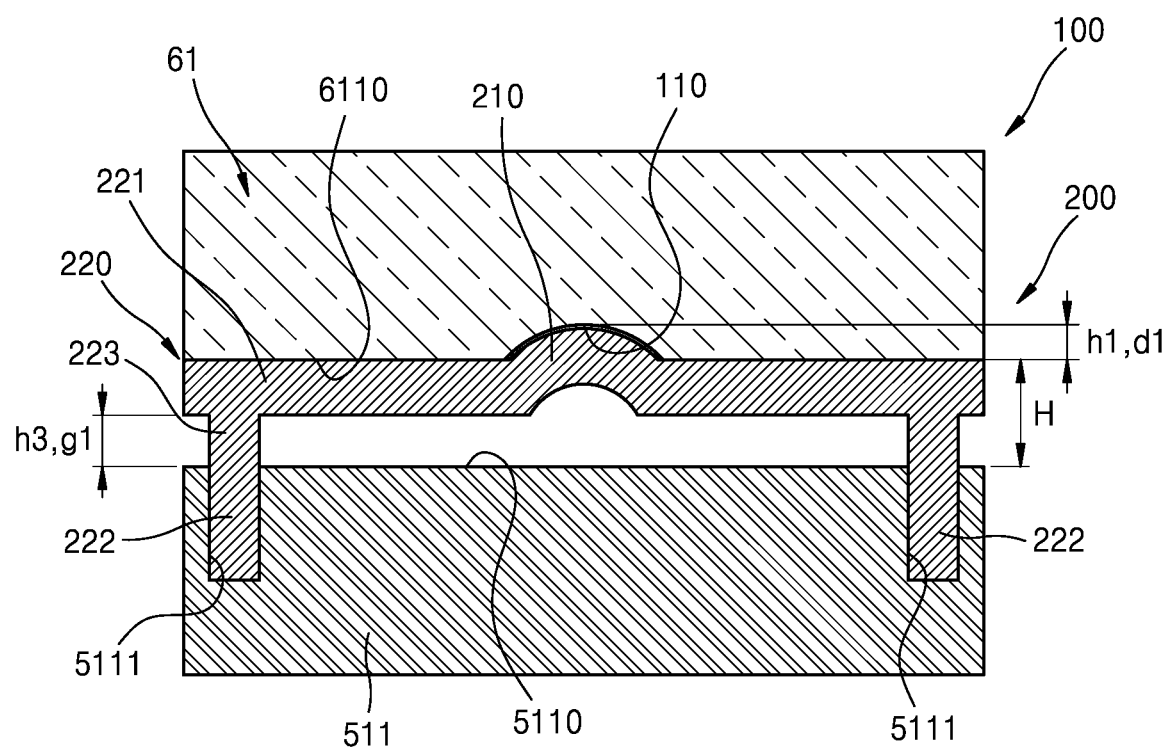
FIG. 16 is a diagram illustrating a relationship between the elastic pressing portion and a position maintaining groove according to an embodiment of the disclosure.
Figure 17:
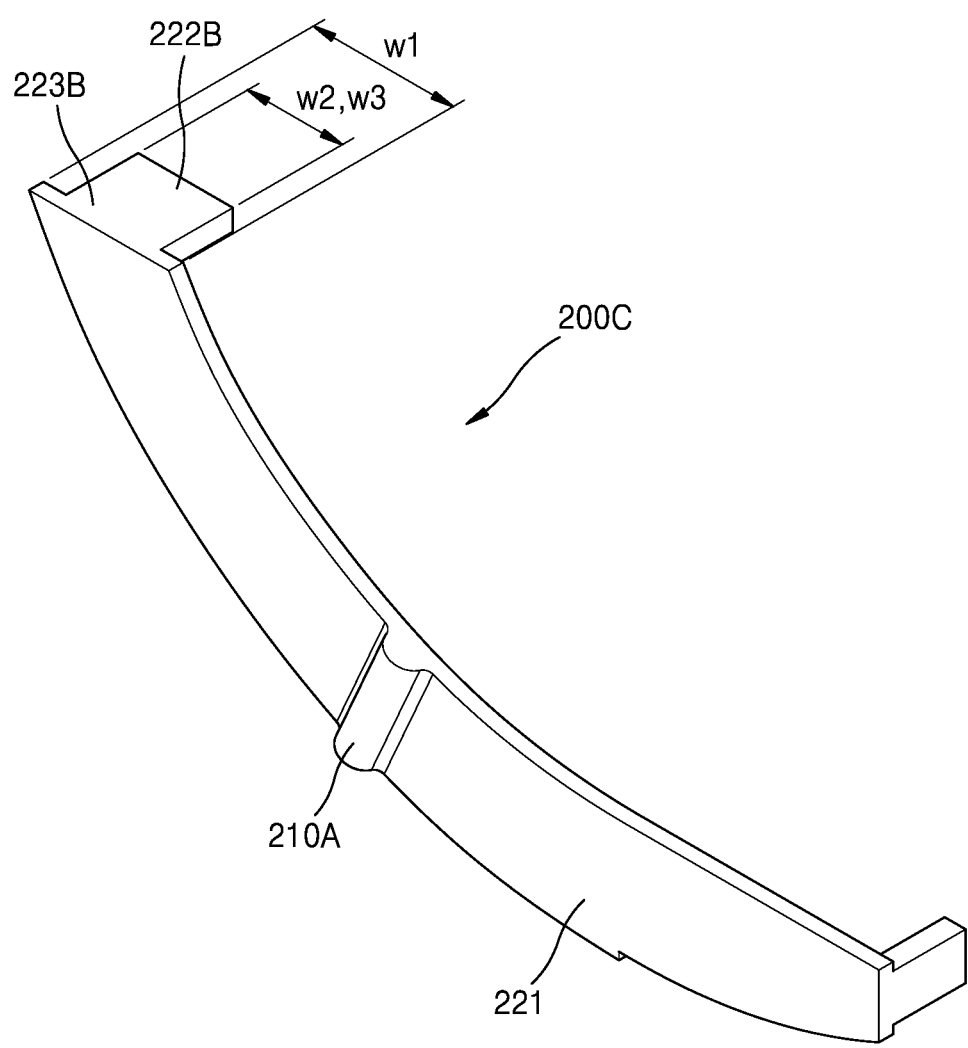
FIG. 17 is a diagram illustrating the elastic pressing portion according to an embodiment of the disclosure.
Figure 18:
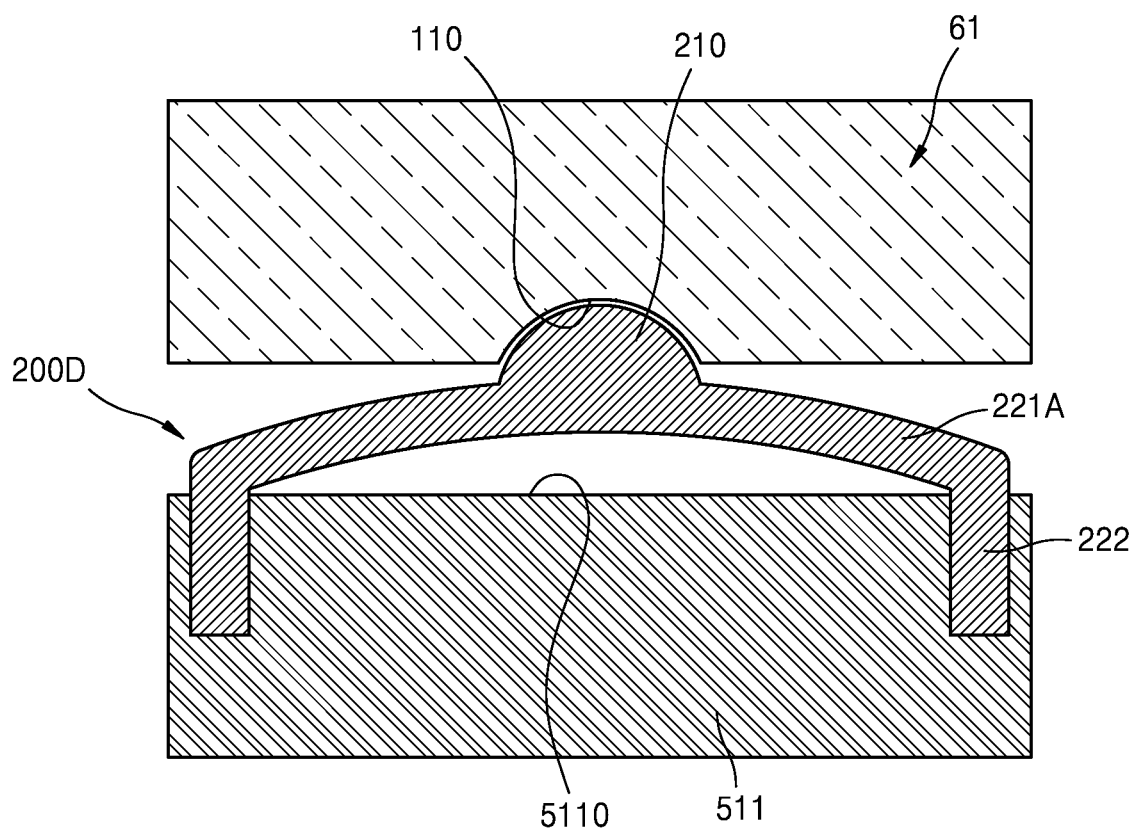
FIG. 18 is a diagram illustrating the elastic pressing portion according to an embodiment of the disclosure.
Figure 19:
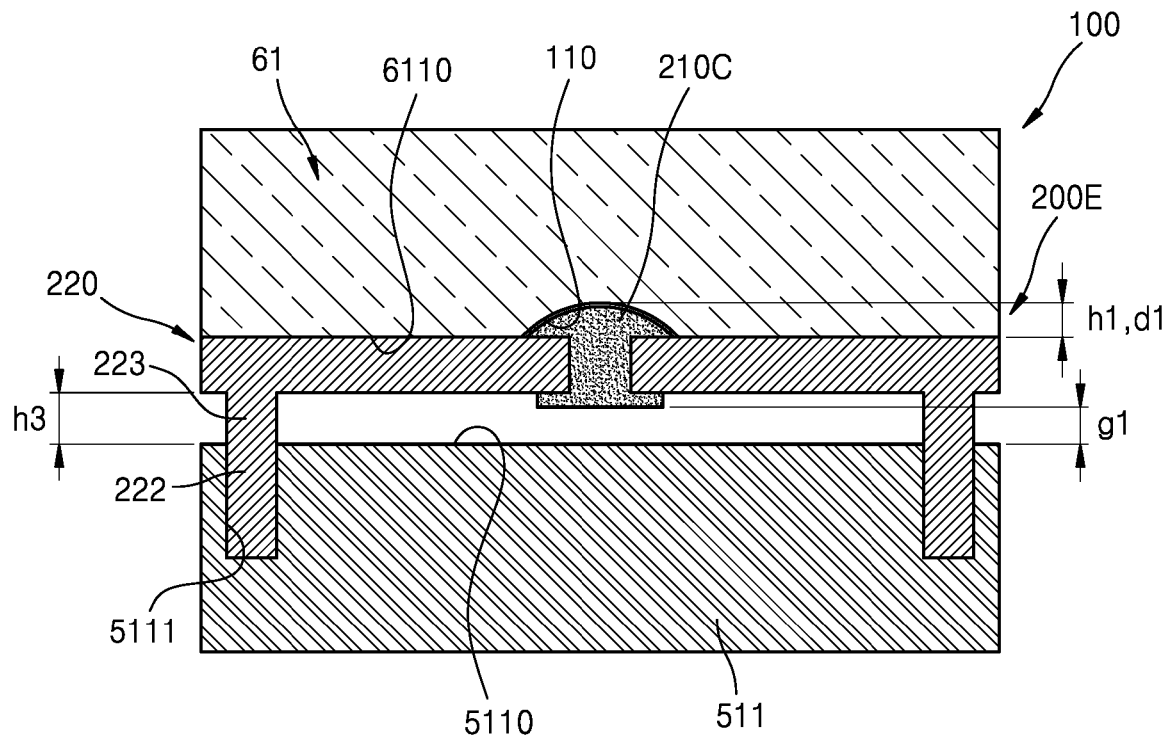
FIG. 19 is a diagram illustrating the elastic pressing portion according to an embodiment of the disclosure.
Figure 20:
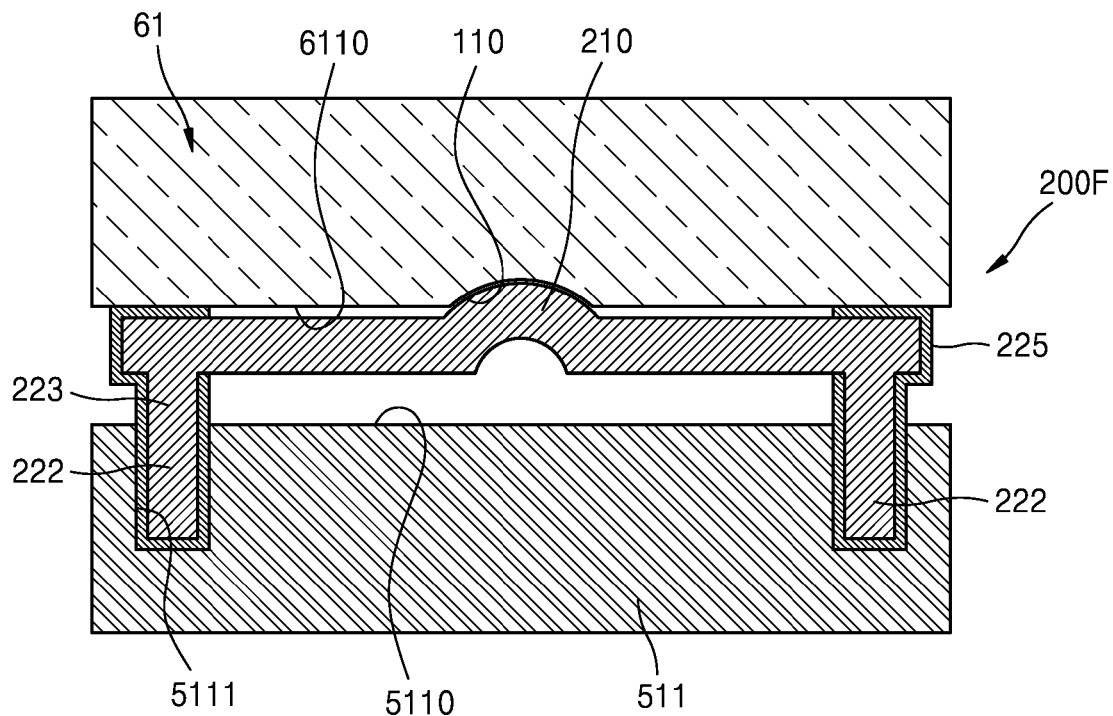
FIG. 20 is a diagram illustrating the elastic pressing portion according to an embodiment of the disclosure.
Figure 21:
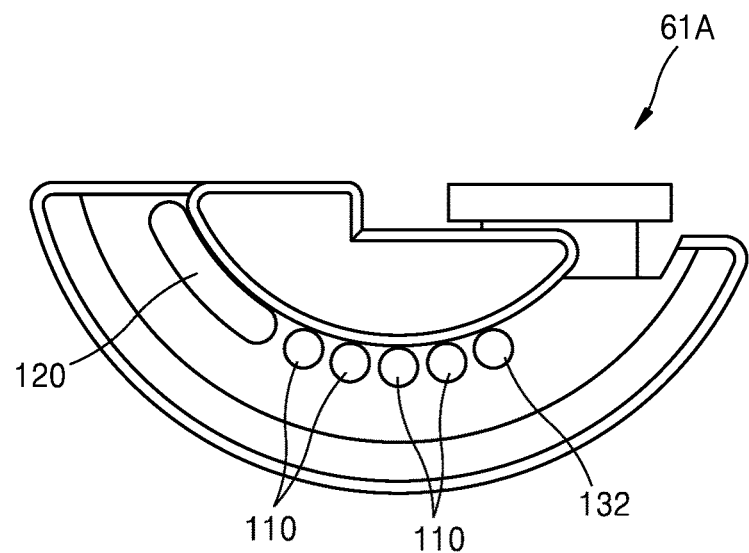
FIG. 21 is a side view of a hinge member according to an embodiment of the disclosure.

FIG. 9 is a diagram illustrating an operating state of the foldable electronic apparatus 1 according to an embodiment of the disclosure. FIG. 10 is an exploded perspective view illustrating an elastic pressing portion 200 arranged between the bracket member 50 and the first and second hinge members 61 and 62 in the hinge structure 30 according to an embodiment of the disclosure. FIG. 11 is a cross-sectional view illustrating an elastic pressing portion 200 arranged between the bracket member 50 and the first and second hinge members 61 and 62 in the hinge structure 30 according to an embodiment of the disclosure. FIG. 12 is a side view of the first hinge member 61 according to an embodiment of the disclosure. FIG. 13 is a perspective view illustrating the elastic pressing portion 200 according to an embodiment of the disclosure. FIG. 14 is a perspective view illustrating the elastic pressing portion 200A according to an embodiment of the disclosure. FIG. 15 is a perspective view illustrating the elastic pressing portion 200B according to an embodiment of the disclosure. FIG. 16 is a diagram illustrating a relationship between the elastic pressing portion 200 and a position maintaining groove 110 according to an embodiment of the disclosure. FIG. 17 is a diagram illustrating the elastic pressing portion 200C according to an embodiment of the disclosure. FIG. 18 is a diagram illustrating the elastic pressing portion 200D according to an embodiment of the disclosure. FIG. 19 is a diagram illustrating the elastic pressing portion 200E according to an embodiment of the disclosure. FIG. 20 is a diagram illustrating the elastic pressing portion 200F according to an embodiment of the disclosure. FIG. 21 is a side view of the first hinge member 61 according to an embodiment of the disclosure. Here, FIG. 11 is a cross-sectional view of the hinge member 61 of FIG. 6, taken along line XI-XI in FIG. 6.

Referring to FIG. 9, in the foldable electronic apparatus 1 according to an embodiment of the disclosure, the flexible display panel 21 may be used in a standing position by standing the first support area 21-1 and the second support area 21-2 at a predetermined angle. To this end, in the hinge structure 30, the first and second housing members 11 and 12 may be maintained in at least one standing position at a predetermined angle.

Referring to FIGS. 10 to 13, to maintain the first and second housing members 11 and 12 in at least one standing position, the hinge structure 30 may include an angle maintaining structure 100 configured to maintain the first and second hinge members 61 and 62 in a predetermined position.

Here, the standing position may be a position in which an angle formed by a first housing 10 and the second housing member 12 is greater than 0 degree and less than 180 degrees. For example, the standing position may be a position in which an angle formed by the first housing 10 and the second housing member 12 is greater than 60 degrees and less than 180 degrees. For example, the standing position may be a position in which an angle between the first housing 10 and the second housing member 12 is greater than 90 degrees and less than 180 degrees.

The configuration and operation of an angle maintaining structure 100 that maintains the position of the first hinge member 61 and an angle maintaining structure 100 that maintains the position of the second hinge member 62 may be substantially the same. Accordingly, hereinafter, for convenience, the angle maintaining structure 100 that maintains the position of the first hinge member 61 will be focused on and described, and a description of the angle maintaining structure 100 that maintains the position of the second hinge member 62 will be omitted.

The angle maintaining structure 100 is arranged between the first rotation guide 511 and the first hinge member 61. The angle maintaining structure 100 may include the elastic pressing portion 200 extending along the rotation direction of the first hinge member 61 and being elastically deformable, and the position maintaining groove 110 which is formed in a surface facing the first rotation guide 511 in the first hinge member 61 and into which a portion of the elastic pressing portion 200 is inserted. The position maintaining groove 110 may have a groove shape, but is not necessarily limited thereto, and may have a through-hole shape.

The elastic pressing portion 200 may include a position maintaining protrusion 210 and an elastic portion 220, the position maintaining protrusion 210 being insertable into the position maintaining groove 110 and the elastic portion 220 supporting the position maintaining protrusion 210 and providing elastic force so that the position maintaining protrusion 210 is inserted into the position maintaining groove 110.

The position maintaining protrusion 210 may have a predetermined height h1. For example, the height h1 of the position maintaining protrusion 210 may be 0.05 mm to 1.0 mm. For example, the height h1 of the position maintaining protrusion 210 may be 0.05 mm to 0.5 mm. For example, the height h1 of the position maintaining protrusion 210 may be 0.05 mm to 0.25 mm. For example, the height h1 of the position maintaining protrusion 210 may be 0.05 mm to 0.15 mm.

The position maintaining protrusion 210 may have a hemispherical shape, as shown in FIG. 13. However, the shape of the position maintaining protrusion 210 is not limited thereto, and may be modified in various ways. As an example, a position maintaining protrusion 210A may have a semicircular shape having a smooth curve along a rotation direction of the first hinge member 61, as shown in FIG. 14. As another example, as shown in FIG. 15, a position maintaining protrusion 210B may have a shape in which an upper surface corresponds to a lower surface to accommodate a space in the position maintaining protrusion 210B.

Referring to FIG. 16, the height h1 of the position maintaining protrusion 210 may be less than or equal to a depth d1 of the position maintaining groove 110. However, the height h1 of the position maintaining protrusion 210 is not necessarily limited thereto, and may be greater than the depth d1 of the position maintaining groove 110 when necessary.

Referring again to FIG. 13, the elastic portion 220 has a length extending along a rotation direction of the first hinge member 61, and is elastically deformed in a direction perpendicular to the longitudinal direction.

Because the elastic portion 220 has a length extending along the rotation direction of the first hinge member 61, the elastic portion 220 may provide a predetermined elastic force at a low height. For example, a height H of the elastic portion 220 may be 0.5 mm or less. For example, the height H of the elastic portion 220 may be 0.3 mm or less. For example, the height H of the elastic portion 220 may be 0.2 mm or less. Here, the height H of the elastic portion 220 may be a height from a first surface 5110 of the first rotation guide 511. For example, the height H of the elastic portion 220 may be the sum of the thickness of a base portion (e.g., deformation portion 221) and a height h3 of a support portion 223.

The elastic portion 220 includes a fixing portion 222 and a deformation portion 221, the fixing portion 222 being fixed to the first rotation guide 511 and the fixing portion 222 supporting the position maintaining protrusion 210, having a length extending along the rotation direction of the first hinge member 61, and being elastically deformable. The deformation portion 221 is elastically deformed in a direction perpendicular to the longitudinal direction.

Referring to FIGS. 13 and 16, the fixing portion 222 may be inserted into a fixing groove 5111 formed in the first rotation guide 511, and be fixed thereto. Although not shown in the drawing, the fixing portion 222 may further include a coupling structure for the smooth assembly with the fixing groove 5111 and to prevent movement after the assembly. For example, the fixing portion 222 may be a coupling structure having a protruding shape protruding toward the fixing groove 5111. However, the coupling structure is not limited thereto, and a spring structure for applying an elastic pressure may also be used.

The fixing portion 222 may have a width w2 equal to a width w1 of the deformation portion 221. However, the width w2 of the fixing portion 222A is not limited thereto, and may be less than the width w1 of the deformation portion 221 as shown in FIG. 14.

The deformation portion 221 may include a metal material and may have a plate shape. The deformation portion 221 has a predetermined elasticity when bent.

The deformation portion 221 may have a structure extending along the rotation direction of the first hinge member 61. The deformation portion 221 may have a shape corresponding to a shape of at least a portion of the first sliding rotation portion 611. Accordingly, the deformation portion 221 may be arranged in the first sliding rotation portion 611.

Referring again to FIG. 16, when no external force is applied to the foldable electronic apparatus 1, the position maintaining protrusion 210 supported by the deformation portion 221 may be spaced apart from the first surface 5110 of the first rotation guide 511 by a predetermined distance.

For example, a distance g1 between the position maintaining protrusion 210 and the first surface 5110 may be 0.05 mm to 1.0 mm. For example, the distance g1 between the position maintaining protrusion 210 and the first surface 5110 may be 0.05 mm to 0.5 mm. For example, the distance g1 between the position maintaining protrusion 210 and the first surface 5110 may be 0.05 mm to 0.25 mm. For example, the distance g1 between the position maintaining protrusion 210 and the first surface 5110 may be 0.05 mm to 0.15 mm.

For example, the distance g1 between the position maintaining protrusion 210 and the first surface 5110 may be greater than or equal to the height h1 of the position maintaining protrusion 210. Accordingly, during the rotation of the first hinge member 61, the position maintaining protrusion 210 may be inserted into and separated from the position maintaining groove 110.

To maintain a distance between the position maintaining protrusion 210 and the first surface 5110, the elastic portion 220 may further include a support portion 223 between the deformation portion 221 and the fixing portion 222.

The support portion 223 may be at opposite end portions of the deformation portion 221. A width w3 of the support portion 223 may be the same as the width w1 of the deformation portion 221. The width w3 of the support portion 223 may be the same as the width w2 of the fixing portion 222. However, the width w3 of the support portion 223 is not limited thereto, and may be modified in various ways. For example, a width w3 of a support portion 223A may be the same as the width w1 of the deformation portion 221 and may be greater than a width w2 of a fixing portion 222A, as shown in FIG. 14. For example, a width w3 of a support portion 223B may be less than the width w1 of the deformation portion 221 and may be the same as a width w2 of a fixing portion 222B, as shown in FIG. 17.

The height h3 of the support portion 223 may be greater than or equal to the height h1 of the position maintaining protrusion 210. Through this, a gap g1 between the deformation portion 221 and the first surface 5110 of the first rotation guide 511 may be maintained.

However, the elastic portion 220 of the elastic pressing portion 200 does not necessarily include the support portion 223. For example, as shown in FIG. 18, in an elastic pressing portion 200D, the deformation portion 221A may be directly connected to the fixing portion 222. In this case, the deformation portion 221A has a bent structure, and the closer the deformation portion 221A is to the position maintaining protrusion 210, the greater the distance from the first surface 5110 of the first rotation guide 511 may be.

The elastic pressing portion 200 may be one body. The material of the position maintaining protrusion 210 may be the same as that of the elastic portion 220. As an example for this, the position maintaining protrusion 210 and the elastic portion 220 may be formed in the elastic pressing portion 200 by processing one plate.

However, the elastic pressing portion 200 does not necessarily have to be one body, and may be composed of a plurality of bodies. For example, as shown in FIG. 19, an elastic pressing portion 200E may be manufactured by manufacturing a position maintaining protrusion 210C separately from the elastic portion 220 and then, fixing the position maintaining protrusion 210C to the elastic portion 220. In this case, the material of the position maintaining protrusion 210C and the material of the elastic portion 220 may be changed.

Referring to FIG. 20, the elastic portion 220 of an elastic pressing portion 200F may further include a reinforcing portion 225 covering at least a portion of the support portion 223 and the fixing portion 222. The reinforcing portion 225 may include a material different from that of the support portion 223 and the fixing portion 222. The reinforcing portion 225 performs a function of fixing the elastic portion 220 to the first rotation guide 511, and securing a space for vertical movement of the position maintaining protrusion 210. In addition, the reinforcing portion 225 may compensate for the processing tolerance of the elastic pressing portion 200F and may prevent the elastic pressing portion 200F from moving freely between the first rotation guide 511 and the first hinge member 61. By preventing the moving of the elastic pressing portion 200F, noise caused by the moving may be prevented.

The reinforcing portion 225 may include a material that is easily elastically deformable compared to the elastic pressing portion 200F. For example, when the material of the elastic pressing portion 200F includes a metal, the material of the reinforcing portion 225 may include a non-metal. For example, the reinforcing portion 225 may include plastic. However, the material of the reinforcing portion 225 is not limited thereto, and various materials may be used as necessary.

Referring again to FIGS. 10 to 12, the position maintaining groove 110 may be formed in a surface opposite to the first rotation guide 511 in the first hinge member 61. For example, the position maintaining groove 110 may be formed in a second surface 6110 of the first sliding rotation portion 611.

A portion of the elastic pressing portion 200 may be inserted into the position maintaining groove 110. For example, the position maintaining protrusion 210 of the elastic pressing portion 200 may be inserted into the position maintaining groove 110.

The position maintaining groove 110 may have a shape corresponding to the shape of the position maintaining protrusion 210. For example, when the position maintaining protrusion 210 has a hemispherical shape, the position maintaining groove 110 may have a hemispherical shape.

The depth d1 of the position maintaining groove 110 may be greater than or equal to the height h1 of the position maintaining protrusion 210. However, the depth d1 of the position maintaining groove 110 is not necessarily limited thereto, and may be less than the height h1 of the position maintaining protrusion 210.

The position maintaining protrusion 210 may be designed such that the position maintaining groove 110 is inserted thereinto when the first housing member 11 and the second housing member 12 are opened at a predetermined angle. For example, the position maintaining protrusion 210 may be designed such that the position maintaining groove 110 is inserted thereinto when the first housing member 11 and the second housing member 12 are opened at an angle of 120 degrees.

However, the position of the position maintaining groove 110 may be changed. For example, the position of the position maintaining groove 110 may be designed such that the position maintaining protrusion 210 is inserted thereinto when the first housing member 11 and the second housing member 12 are opened at one of 112 degrees, 135 degrees, and 158 degrees.

As an example, the number of position maintaining grooves 110 may be singular. As another example, the number of position maintaining grooves 110 may be plural. For example, as shown in FIG. 21, there may be four position maintaining grooves 110. A plurality of position maintaining grooves 110 may be arranged along the rotation direction of a first hinge member 61A. Accordingly, the first and second housing members 11 and 12 may be maintained in various standing positions.

In the process of opening or closing the foldable electronic apparatus 1 by a user, the first and second housing members 11 and 12 may be placed in a standing position at a predetermined angle. At this time, the position maintaining protrusion 210 of the elastic pressing portion 200 is inserted into the position maintaining groove 110 that is formed in the first and second hinge members 61 and 62 by a predetermined elastic force provided by the elastic portion 220. Accordingly, the first and second housing members 11 and 12 maintain a predetermined standing position until an external force greater than the elastic force provided to the position maintaining protrusion 210 inserted into the position maintaining groove 110 is applied.

A sliding groove 120 into which the position maintaining protrusion 210 may be inserted may be arranged on one side of the position maintaining groove 110. The sliding groove 120 may be disposed on one side of the position maintaining groove 110 in the rotation direction of the first hinge member 61 in the second surface 6110 of the first sliding rotation portion 611. The sliding groove 120 may have a groove shape, but is not necessarily limited thereto, and may have a through-hole shape.

The sliding groove 120 may be arranged such that the position maintaining protrusion 210 is inserted into the sliding groove 120 when an angle formed by the first and second housing members 11 and 12 is less than 90 degrees. Through this sliding groove 120, the user may easily open the first and second housing members 11 and 12 up to 90 degrees.

The sliding groove 120 extends along the direction of rotation of the first hinge member 61. A length l2 of the sliding groove 120 is greater than a length l1 of the position maintaining groove 110. For example, the length l2 of the sliding groove 120 may be 5 to 15 times the length l1 of the position maintaining groove 110. Here, the lengths l2 and l1 of the sliding groove 120 and the position maintaining groove 110 are defined as the lengths according to the rotation direction of the first hinge member 61.

A depth d2 of the sliding groove 120 (see FIG. 27) may be the same as or greater than a depth d1 of the position maintaining groove 110. Because the position maintaining protrusion 210 is inserted into the sliding groove 120, frictional resistance due to the position maintaining protrusion 210 may be reduced. Accordingly, the first housing member 11 or the second housing member 12 may be gently opened to a predetermined standing position.

The angle maintaining structure 100 may be configured to maintain the first and second housing members 11 and 12 in at least one of the unfolded position or the folded position. To this end, the angle maintaining structure 100 may include at least one of a locking groove 131 or flat surface maintaining groove 132 formed in the first hinge member 61. For example, as shown in FIG. 12, the locking groove 131 and the flat surface maintaining groove 132 may be on either side of the position maintaining groove 110 in the rotation direction of the first hinge member 61. The locking groove 131 and the flat surface maintaining groove 132 may have a groove shape, but are not necessarily limited thereto, and may have a through-hole shape.

The locking groove 131 and the flat surface maintaining groove 132 may have a shape corresponding to the shape of the position maintaining protrusion 210. The shapes of the locking groove 131 and the flat surface maintaining groove 132 may be the same as the shape of the position maintaining groove 110. However, the shapes of the locking groove 131 and the flat surface maintaining groove 132 are not necessarily limited thereto, and may be different from the shape of the position maintaining groove 110.

A depth d3 of the locking groove 131 (see FIG. 27) and a depth d4 of the flat surface maintaining groove 132 (see FIG. 28) may be greater than or equal to the height h1 of the position maintaining protrusion 210. The depths d3 and d4 of the locking groove 131 and the flat surface maintaining groove 132 may be the same as the depth d1 of the position maintaining groove 110. However, the depths d3 and d4 of the locking groove 131 and the flat surface maintaining groove 132 are not necessarily limited thereto, and may be different from the depth d1 of the position maintaining groove 110.

The locking groove 131 may be designed such that the position maintaining protrusion 210 is inserted thereinto when the first housing member 11 and the second housing member 12 are in the folded position. The flat surface maintaining groove 132 may be designed such that the position maintaining protrusion 210 is inserted thereinto when the first housing member 11 and the second housing member 12 are in the unfolded position.

On the other hand, in the above-described embodiment, the description is mainly focused on the example in which the locking groove 131 and the flat surface maintaining groove 132 are arranged on the first hinge member 61. However, this is a selective configuration, and the first hinge member 61 may not include any of the locking groove 131 and the flat surface maintaining groove 132, or may include only one of them. For example, as shown in FIG. 21, the first hinge member 61A may include the flat surface maintaining groove 132 and may not include the locking groove 131.

Figure 22:
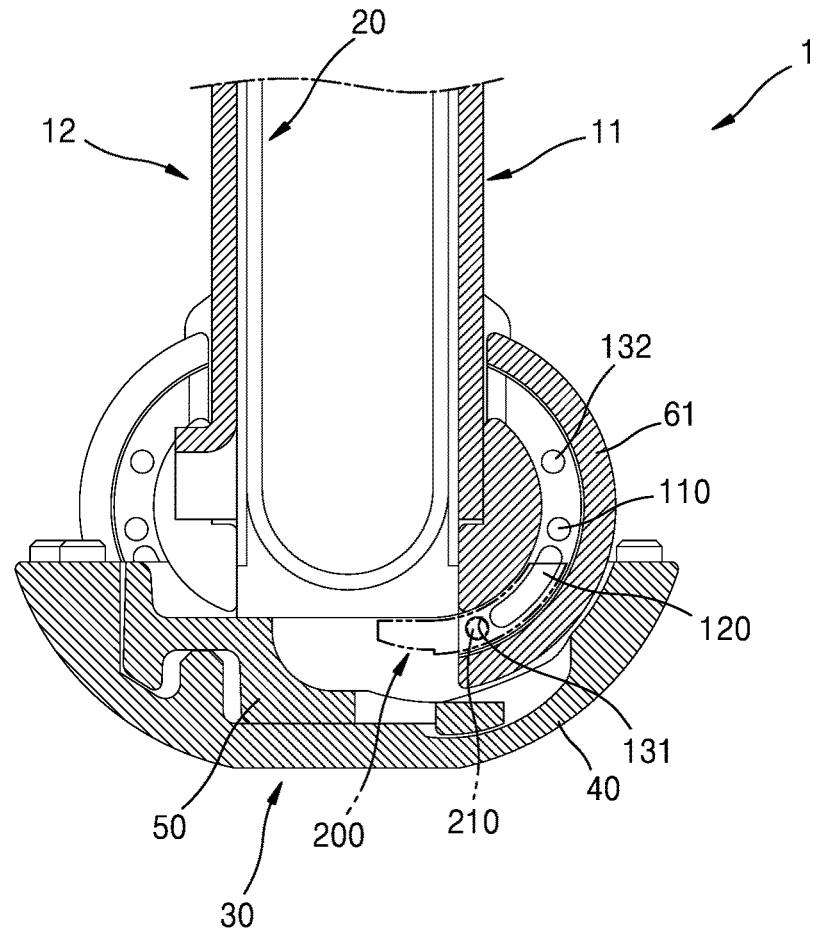
FIG. 22 shows a state in which a position maintaining protrusion is inserted into a locking groove when first and second housing members of a foldable display apparatus are in a folded position, according to an embodiment of the disclosure.
Figure 23:
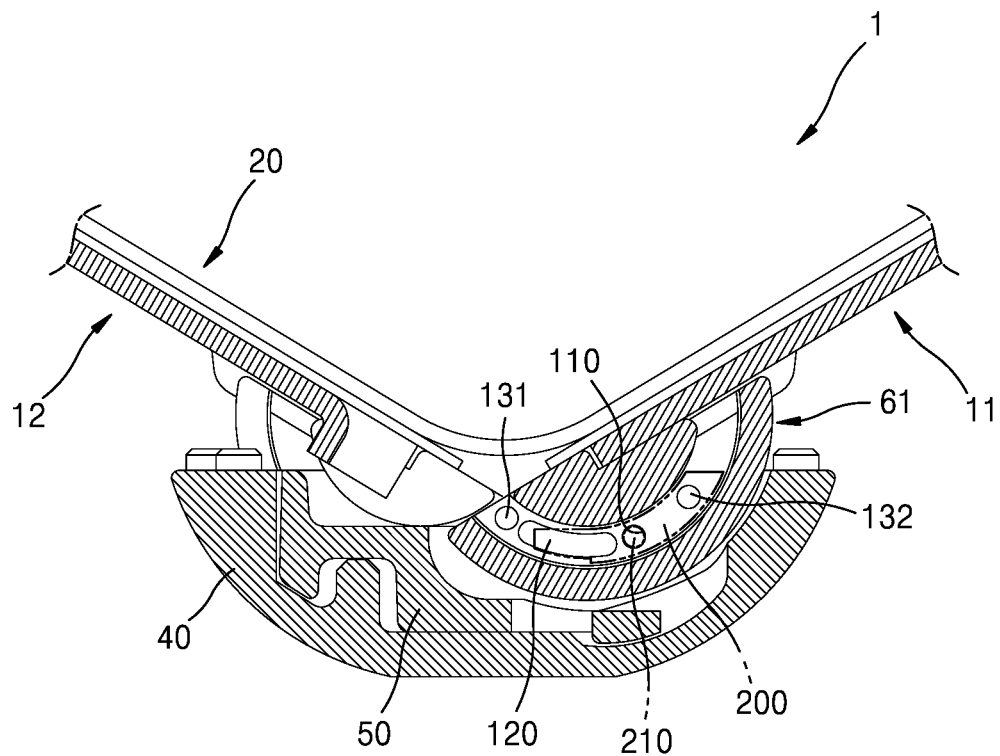
FIG. 23 shows a state in which the position maintaining protrusion is inserted into the position maintaining groove when the first and second housing members of the foldable display apparatus are in a standing position, according to an embodiment of the disclosure.
Figure 24:
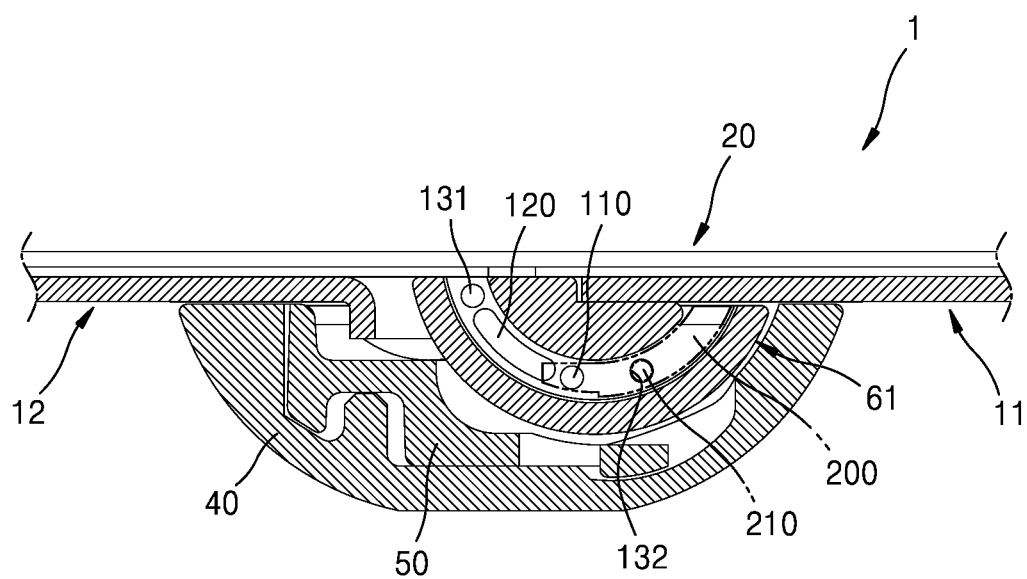
FIG. 24 shows a state in which the position maintaining protrusion is inserted into a flat surface maintaining groove when the first and second housing members of the foldable display apparatus are in an unfolded position, according to an embodiment of the disclosure.

FIG. 22 shows a state in which the position maintaining protrusion 210 is inserted into the locking groove 131 when the first and second housing members 11 and 12 of the foldable electronic apparatus 1 according to an embodiment of the disclosure are in the folded position. FIG. 23 shows a state in which the position maintaining protrusion 210 into the position maintaining groove 110 when the first and second housing members 11 and 12 of the foldable electronic apparatus 1 according to an embodiment of the disclosure are in the standing position. FIG. 24 shows a state in which the position maintaining protrusion 210 is inserted into the flat surface maintaining groove 132 when the first and second housing members 11 and 12 of the foldable electronic apparatus 1 according to an embodiment of the disclosure are in the unfolded position. FIGS. 25, 26, 27, 28, 29, 30 and 31 are diagrams illustrating the operation of the elastic pressing portion 200 as the first and second hinge members 61 and 62 are rotated according to various embodiments of the disclosure. Here, FIG. 23 is a cross-sectional view of the foldable electronic apparatus 1 of FIG. 9, taken along line XXIII-XXIII in FIG. 9, and FIG. 24 is a cross-sectional view of the foldable electronic apparatus 1 of FIG. 1, taken along line XXIV-XXIV in FIG. 1.

Figure 25:
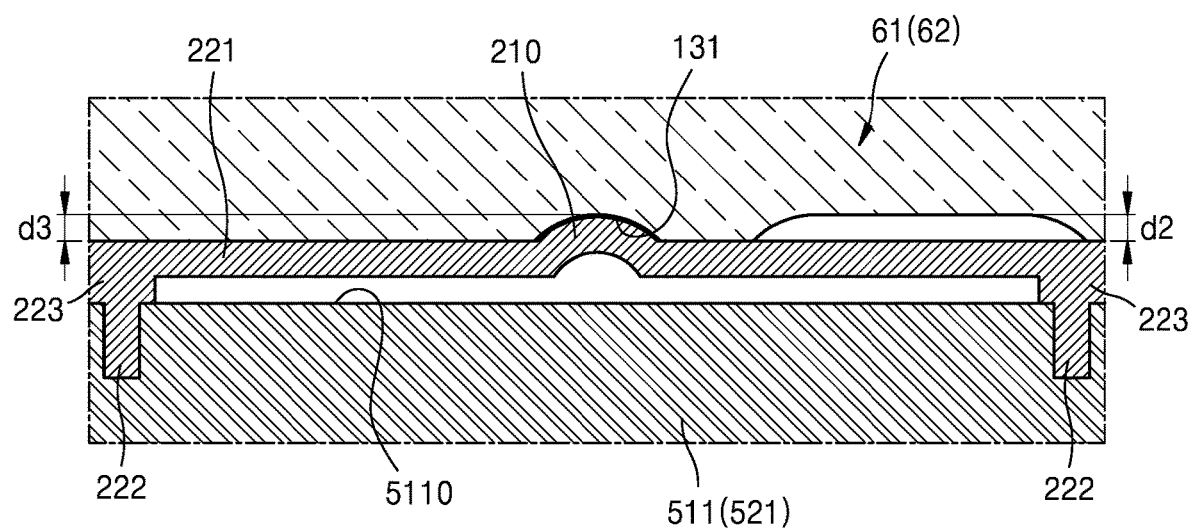
FIG. 25 shows the operation of the elastic pressing portion as the first and second hinge members are rotated according to an embodiment of the disclosure.

Referring to FIGS. 22 and 25, the position maintaining protrusion 210 is inserted into the locking groove 131. The elastic pressing portion 200 is fixed to the first rotation guide 511 by using the fixing portion 222, and a predetermined distance is secured between the deformation portion 221 and the first surface 5110 of the first rotation guide 511 by using the support portion 223.

The position maintaining protrusion 210 is pressed in the direction of being inserted into the locking groove 131 by the elastic force provided by the deformation portion 221. Accordingly, the first and second housing members 11 and 12 remain in the folded position.

Figure 26:
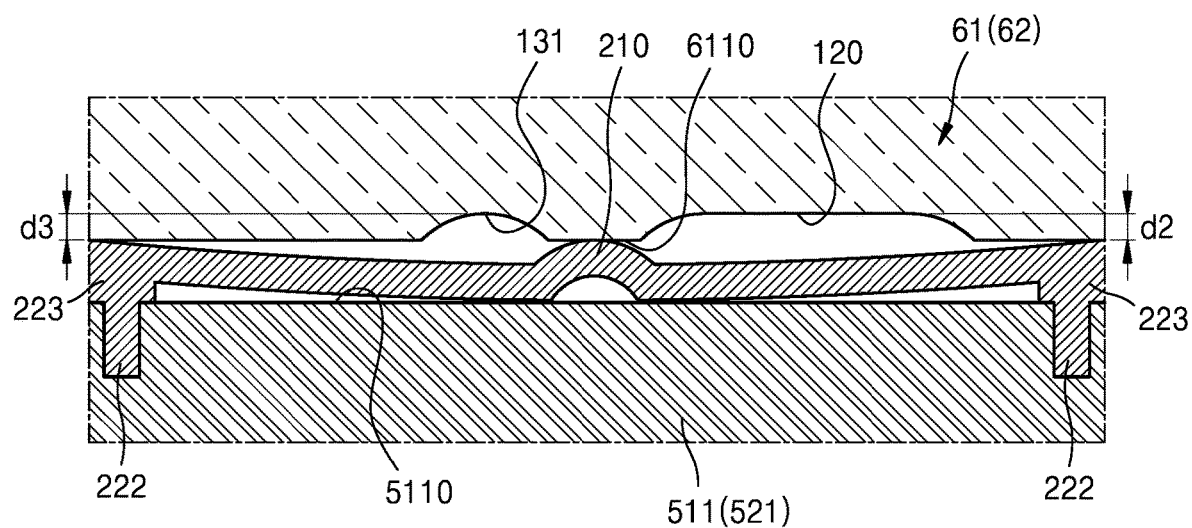
FIG. 26 shows the operation of the elastic pressing portion as the first and second hinge members are rotated according to an embodiment of the disclosure.

Referring to FIG. 26, when a user applies a force of a predetermined amount or more to at least one of the first housing member 11 or the second housing member 12 to open the foldable electronic apparatus 1, the first hinge member 61 or the second hinge member 62 moves along the rotation direction thereof. At this time, the position maintaining protrusion 210 is separated from the locking groove 131 through the space secured by the support portion 223. The position maintaining protrusion 210 separated from the locking groove 131 contacts the second surface 6110 of a first sliding rotation portion 611 and a second sliding rotation portion 621.

Figure 27:
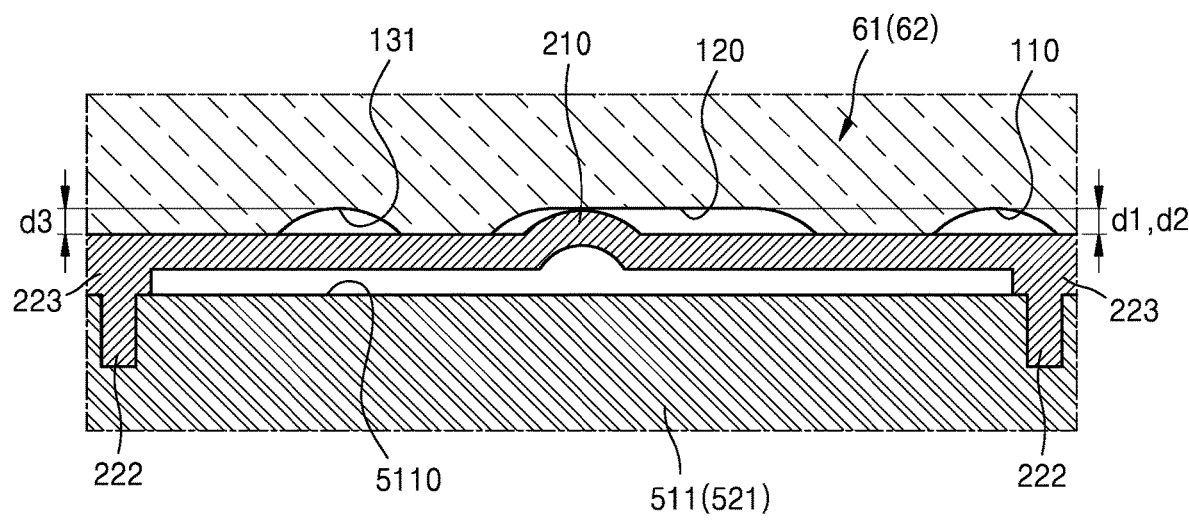
FIG. 27 shows the operation of the elastic pressing portion as the first and second hinge members are rotated according to an embodiment of the disclosure.

Referring to FIG. 27, when the user continuously applies a force, the position maintaining protrusion 210 contacting the second surface 6110 is inserted into the sliding groove 120. The force applied to the position maintaining protrusion 210 when the position maintaining protrusion 210 is inserted into the sliding groove 120 is less than the force applied to the position maintaining protrusion 210 when the position maintaining protrusion 210 is in contact with the second surface 6110.

While there is no sliding groove 120 in the first and second hinge members 61 and 62, when the position maintaining protrusion 210 is separated from the position maintaining groove 110, the position maintaining protrusion 210 continuously apply pressure to the second surface 6110 between a position limitation groove and the locking groove 131 in the first and second hinge members 61 and 62 due to the elastic force of the elastic portion 220. Accordingly, in the process of rotating the first hinge member 61, frictional resistance due to the position maintaining protrusion 210 may be continuously generated. As the magnitude of the elastic force provided by the elastic portion 220 increases, the frictional resistance due to the position maintaining protrusion 210 may increase. Frictional resistance due to the position maintaining protrusion 210 may make rotation of the first and second housing members 11 and 12 respectively connected to the first and second hinge members 61 and 62 unnatural or difficult.

On the other hand, in the hinge structure 30 according to an embodiment of the disclosure, when the position maintaining protrusion 210 is separated from the position maintaining groove 110, the first and second hinge members 61 and 62 may be rotated in the state where the position maintaining protrusion 210 is inserted into the sliding groove 120 of a predetermined depth d2. Accordingly, frictional resistance due to the position maintaining protrusion 210 may be reduced in the process of rotating the first and second hinge members 61 and 62. Therefore, it is possible to smoothly move the first and second housing members 11 and 12 to a predetermined standing position.

Figure 28:
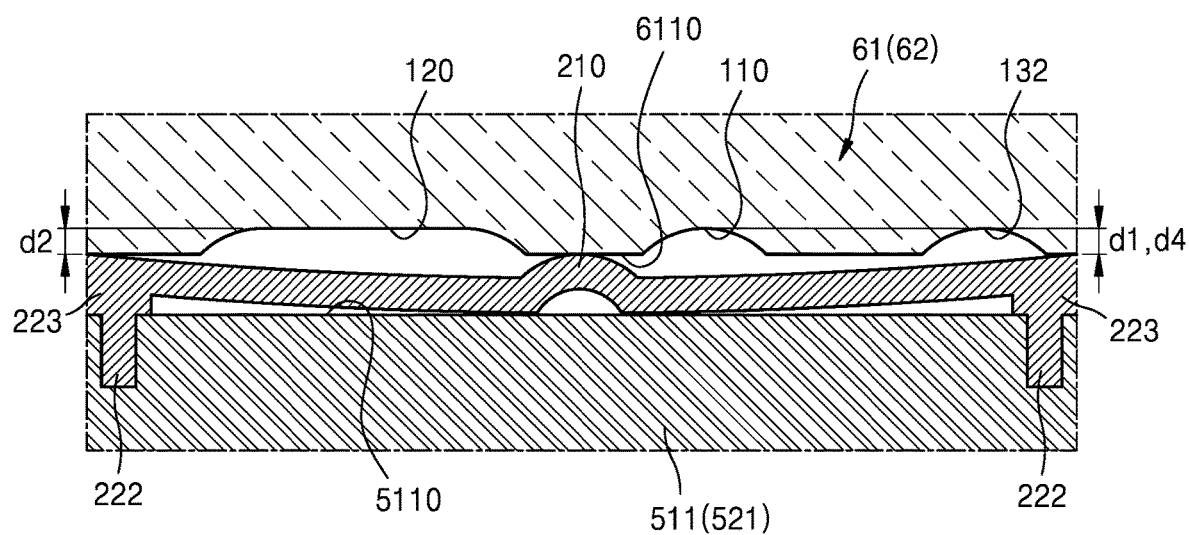
FIG. 28 shows the operation of the elastic pressing portion as the first and second hinge members are rotated according to an embodiment of the disclosure.
Figure 29:
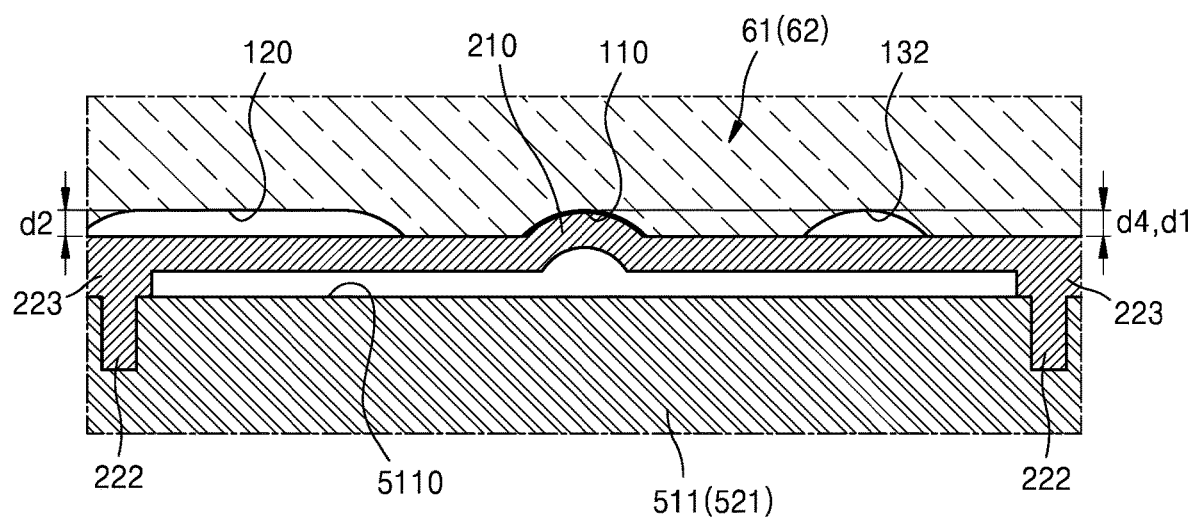
FIG. 29 shows the operation of the elastic pressing portion as the first and second hinge members are rotated according to an embodiment of the disclosure.

Referring to FIGS. 28 and 29, when the user continuously applies a force, the position maintaining protrusion 210 is separated from the sliding groove 120 and contacts the second surface 6110. Thereafter, the position maintaining protrusion 210 is inserted into the position maintaining groove 110, and the first and second hinge members 61 and 62 maintain a predetermined rotational position by using the elastic force provided by the elastic portion 220. Accordingly, as shown in FIG. 23, the first and second housing members 11 and 12 may maintain a standing position, for example, at an angle of about 120 degrees.

Figure 30:
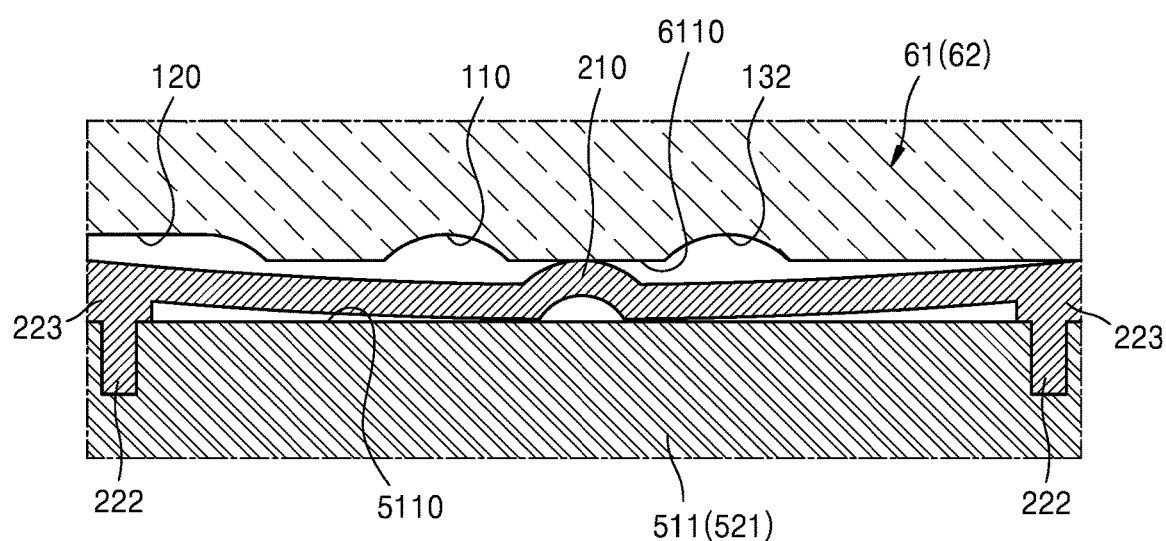
FIG. 30 shows the operation of the elastic pressing portion as the first and second hinge members are rotated according to an embodiment of the disclosure.

Referring to FIG. 30, when a user applies a force greater than the elastic force provided by the elastic portion 220 to at least one of the first housing member 11 or the second housing member 12, the first hinge member 61 or the second hinge member 62 moves along its rotation direction. At this time, the position maintaining protrusion 210 is separated from the position maintaining groove 110 through the space secured by the support portion 223.

Figure 31:
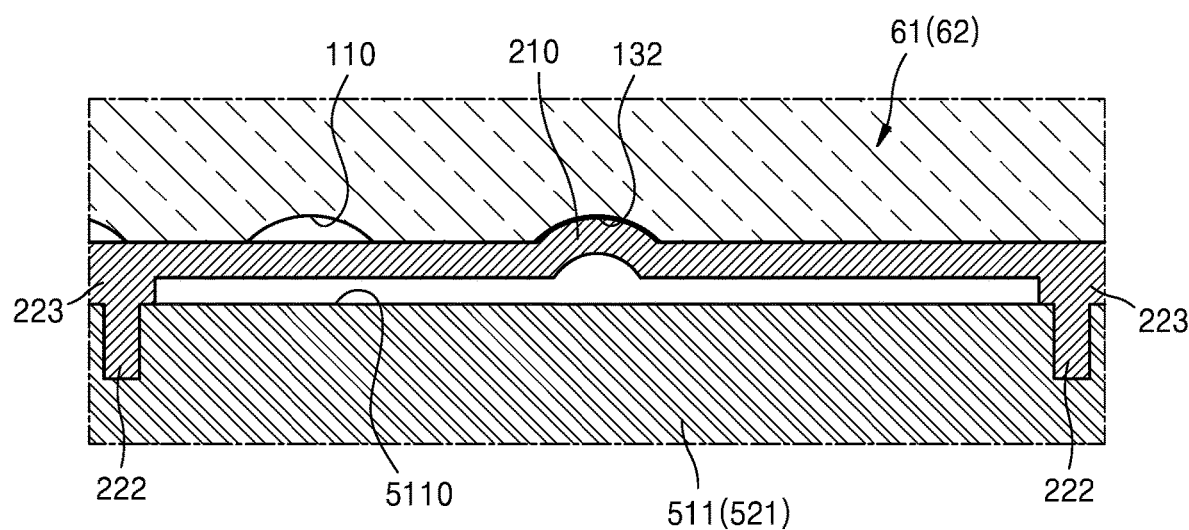
FIG. 31 shows the operation of the elastic pressing portion as the first and second hinge members are rotated according to an embodiment of the disclosure.

Referring to FIG. 31, when the user continuously applies force, the position maintaining protrusion 210 contacts the second surface 6110 between the position maintaining groove 110 and the flat surface maintaining groove 132, and then, is inserted into the flat surface maintaining groove 132.

Accordingly, as shown in FIG. 24, the first and second housing members 11 and 12 may maintain an unfolded position, for example, at an angle of about 180 degrees.

Figure 32:
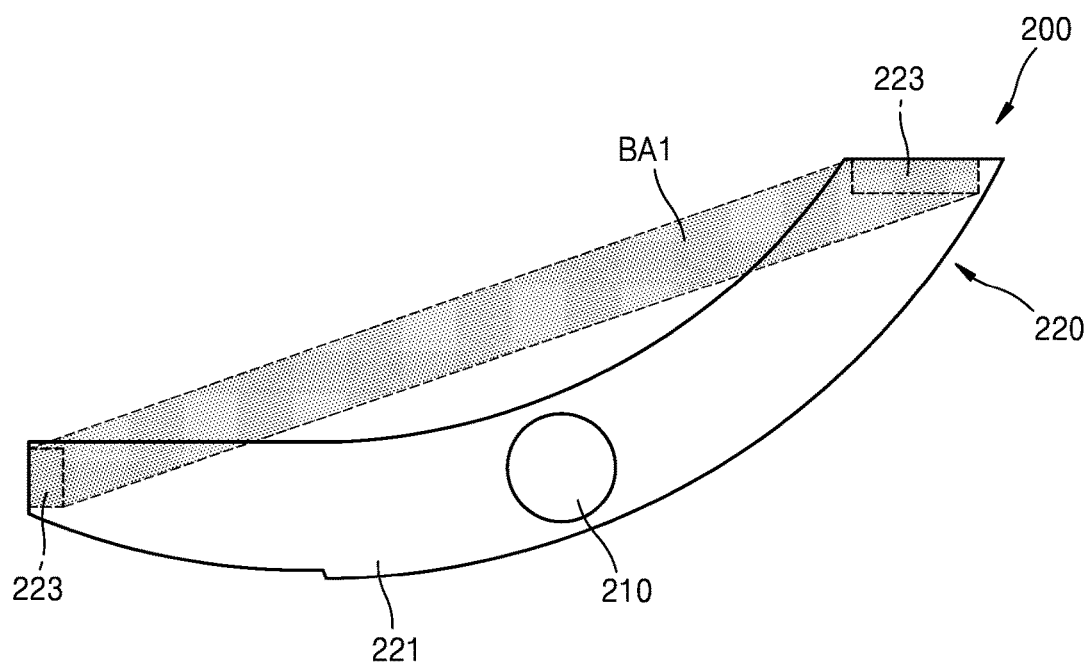
FIG. 32 is a plan view of the elastic pressing portion according to an embodiment of the disclosure.
Figure 33:
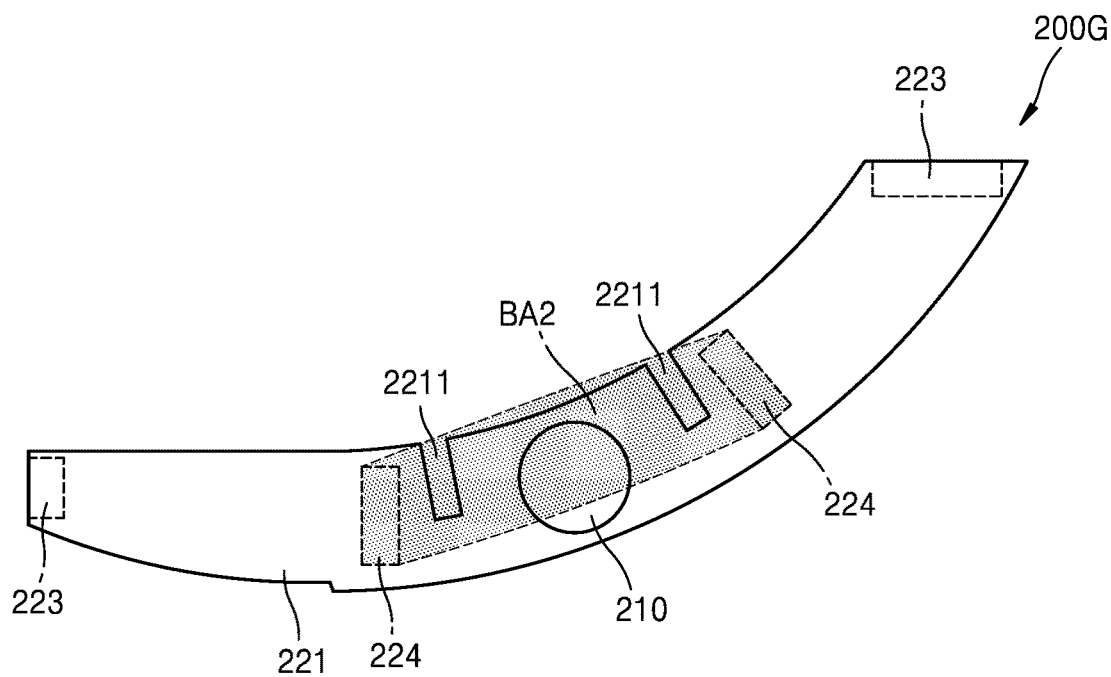
FIG. 33 is a plan view of the elastic pressing portion according to an embodiment of the disclosure.
Figure 34:
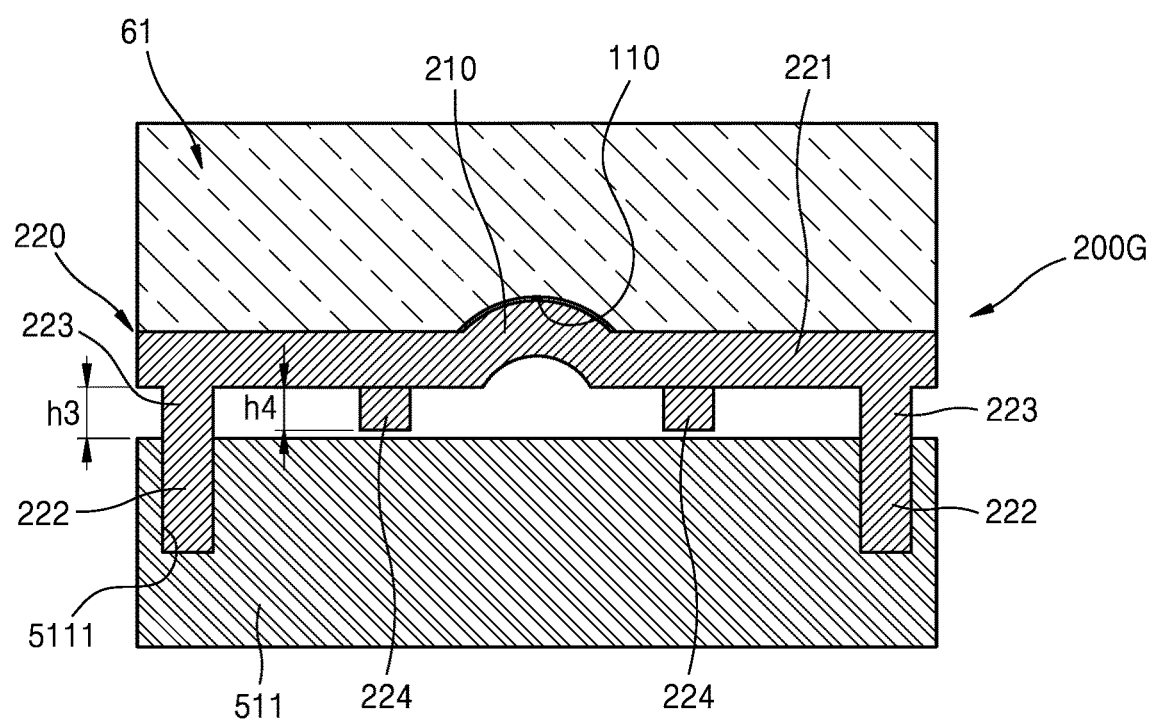
FIG. 34 is a diagram illustrating the elastic pressing portion of FIG. 33 according to an embodiment of the disclosure.
Figure 35:
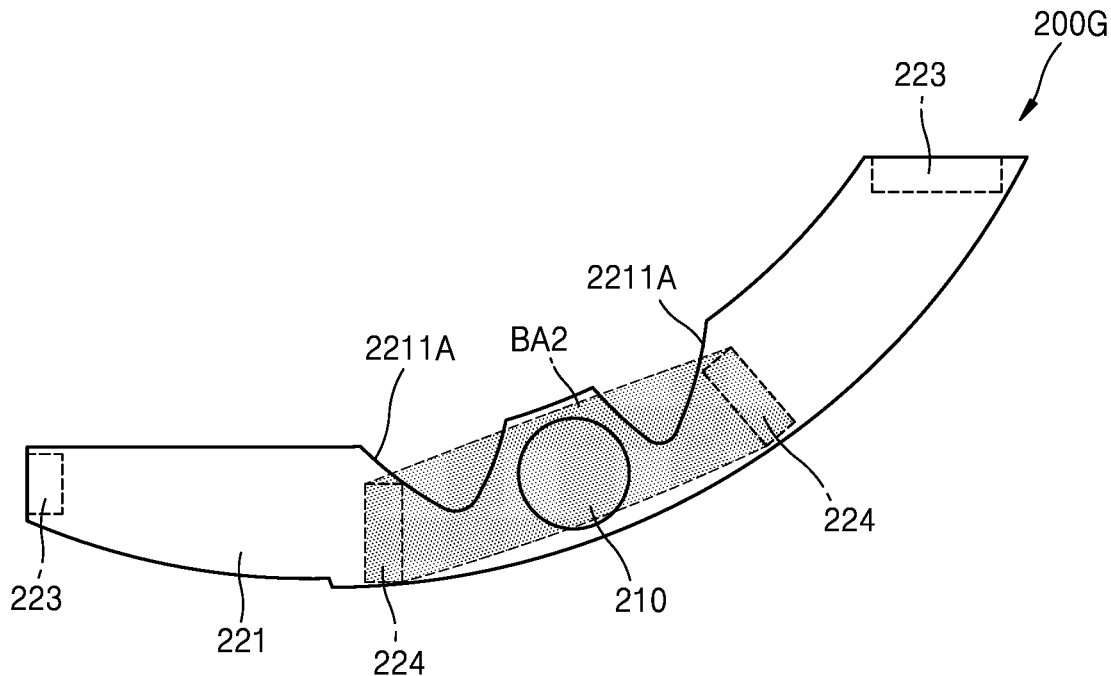
FIG. 35 is a plan view illustrating the elastic pressing portion according to an embodiment of the disclosure.
Figure 36:
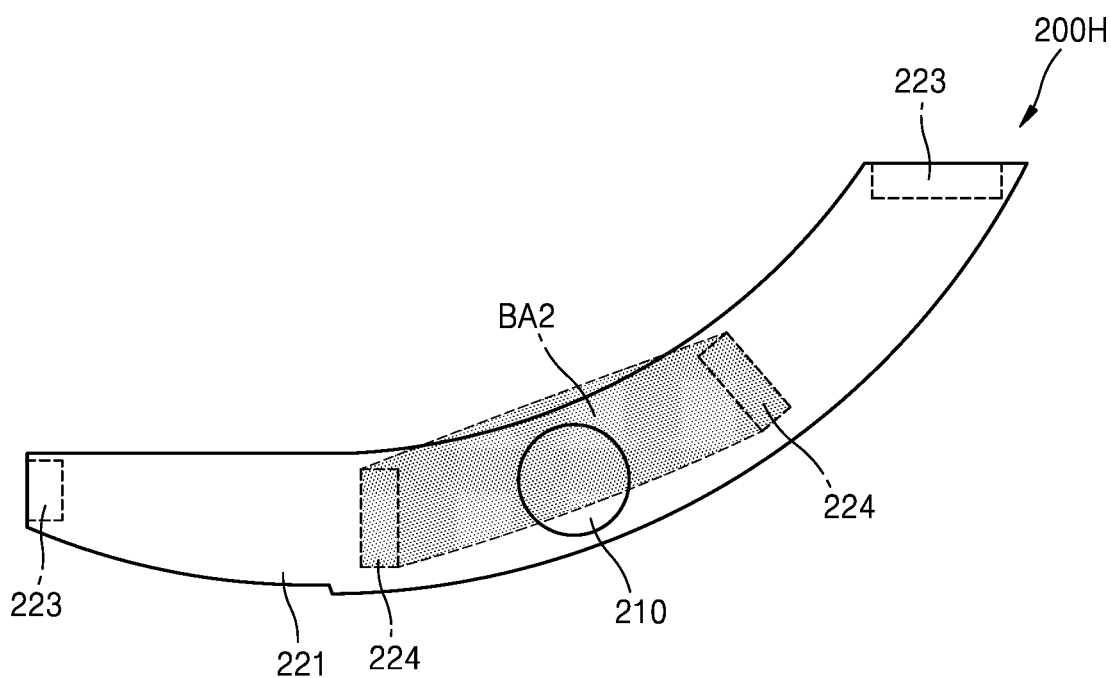
FIG. 36 is a plan view illustrating the elastic pressing portion according to an embodiment of the disclosure.
Figure 37:
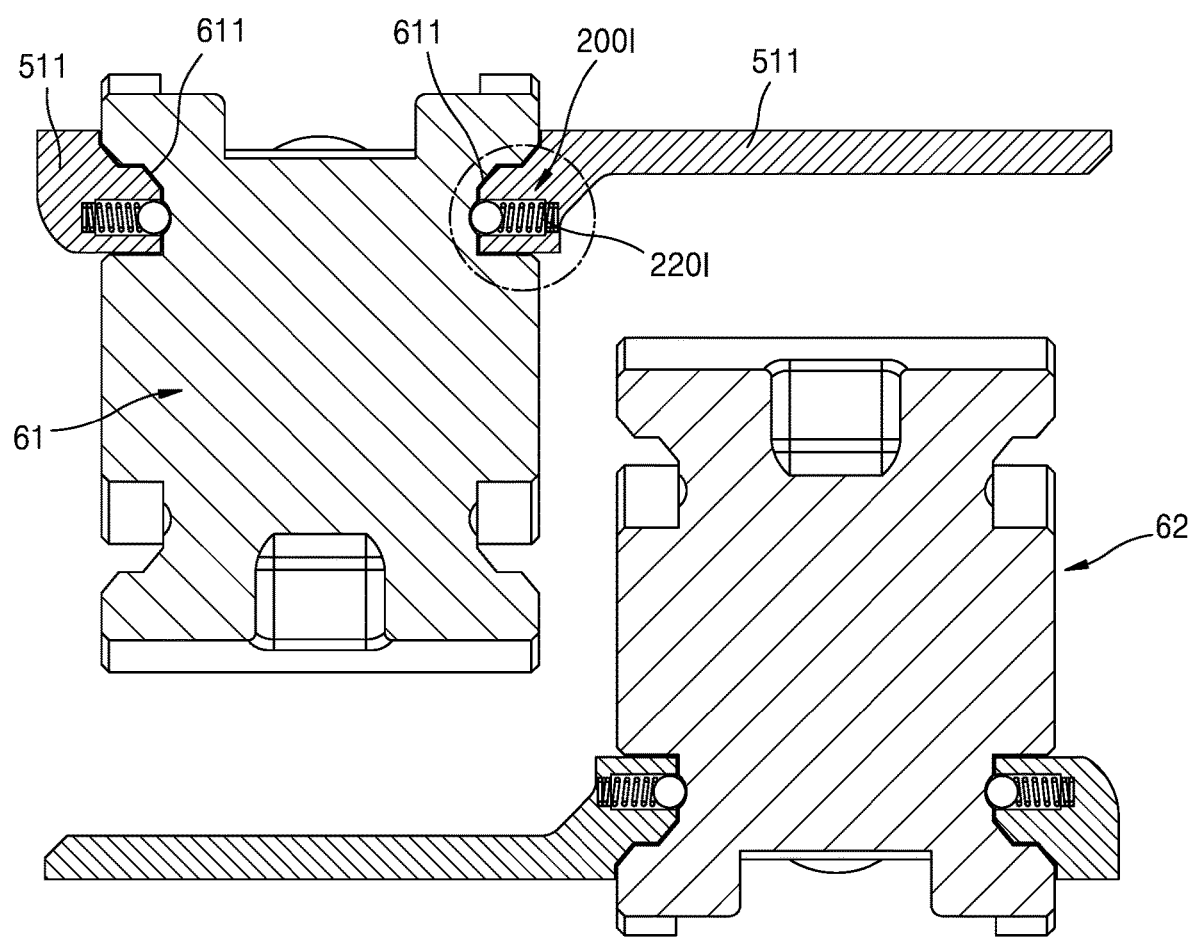
FIG. 37 is a diagram illustrating the elastic pressing portion according to an embodiment of the disclosure.
Figure 38:
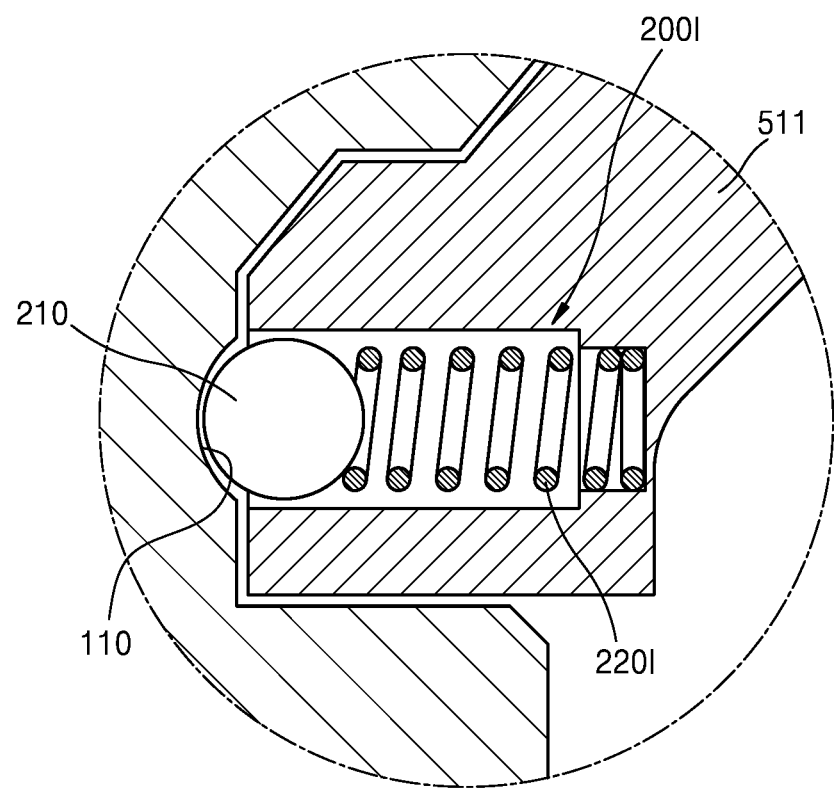
FIG. 38 is an enlarged view of a portion of FIG. 37 according to an embodiment of the disclosure.

FIG. 32 is a plan view of an elastic pressing portion 200 according to an embodiment of the disclosure. FIG. 33 is a plan view of the elastic pressing portion 200G according to an embodiment of the disclosure. FIG. 34 is a diagram illustrating the elastic pressing portion 200G of FIG. 33 according to an embodiment of the disclosure. FIG. 35 is a plan view of the elastic pressing portion 200G according to an embodiment of the disclosure. FIG. 36 is a plan view of an elastic pressing portion 200H according to an embodiment of the disclosure. FIG. 37 is a diagram illustrating an elastic pressing portion 200I according to an embodiment of the disclosure. FIG. 38 is an enlarged view of a portion of FIG. 37 according to an embodiment of the disclosure.

Referring to FIG. 32, because the elastic pressing portion 200 is supported by the support portions 223 at opposite end portions, a virtual balance area BA1 may be formed in an area connecting the opposite ends of the deformation portion 221 to each other.

The deformation portion 221 of the elastic portion 220 may have a shape corresponding to a shape of the second surface 6110 of the first sliding rotation portion 611. For example, the deformation portion 221 may have an arc shape. The position maintaining protrusion 210 in the arc-shaped deformation portion 221 may be located outside the virtual balance area BA1. Accordingly, the deformation portion 221 may be bent obliquely due to the elastic force in the process of the position maintaining protrusion 210 being inserted into and removed from the position maintaining groove 110, which may reduce the elastic force provided by the elastic portion 220.

Referring to FIGS. 33 and 34, in consideration of this point, the elastic pressing portion 200G according to an embodiment of the disclosure may further include an auxiliary support portion 224 between the plurality of support portions 223. The auxiliary support portion 224 may have a height h4 less than the height h3 of the support portion 223. Unlike the support portion 223, the auxiliary support portion 224 may not be fixed to the first rotation guide 511.

The auxiliary support portion 224 may move a balance area BA2 of the elastic pressing portion 200G to position at least a portion of the position maintaining protrusion 210 in the virtual balance area BA2. Accordingly, it is possible to prevent the deformation portion 221 from bending obliquely in the process of inserting the position maintaining protrusion 210 into the position maintaining groove 110.

On the other hand, when the auxiliary support portions 224 are arranged in consideration of the balance area BA2, an area capable of undergoing an elastic deformation in the deformation portion 221 may be reduced due to the gap between the auxiliary support portions 224. Therefore, unintentionally, the elastic deformation itself of the deformation portion 221 may not be easy.

In consideration of this point, the deformation portion 221 may include a slit 2211 formed between the auxiliary support portions 224. For example, a pair of slits 2211 may be formed on either side of the position maintaining protrusion 210 in the deformation portion 221. The pair of slits 2211 may be between the position maintaining protrusion 210 and the plurality of auxiliary support portions 224. Through this slit 2211, the deformation portion 221 may be easily bent.

The shape of the slit 2211 may vary. For example, the slits 2211 and 2211A may have a polygonal structure as shown in FIG. 33 or a curved structure as shown in FIG. 35.

In the above-described embodiment of the disclosure, the elastic pressing portion 200G includes the slit 2211 between the auxiliary support portions 224. However, embodiments are not limited thereto. For example, as shown in FIG. 36, the elastic pressing portion 200H may have a structure in which the slit 2211 is not formed between the auxiliary support portions 224.

Meanwhile, in the above-described embodiment, a plate spring structure is selected as the elastic portion 220 of the elastic pressing portion 200, but embodiments of the disclosure are not limited thereto. For example, an elastic portion 220I of the elastic pressing portion 200I may have a coil spring structure as shown in FIGS. 37 and 38.

In the hinge structure and the foldable electronic apparatus including the same according to embodiments of the disclosure, the housing of the foldable electronic apparatus may be supported at various angles while ensuring that the foldable electronic apparatus has a thin and durable structure.

According to embodiments of the disclosure, because the structure for supporting the housing of the foldable electronic apparatus at various angles is simple and small, the hinge structure and the foldable electronic apparatus including the same according to embodiments of the disclosure may have a reduced weight while being possible to secure a space for other components.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A foldable electronic apparatus comprising:
   first housing member and second housing member spaced apart from each other by a predetermined distance;
   a flexible display supported by the first housing member and the second housing member; and
   a hinge structure connecting the first housing member and the second housing member to each other,
   wherein the hinge structure comprises:
      a hinge member fixed to each of the first housing member and the second housing member,
      a rotation support portion rotatably supporting the hinge member and including a rotation guide that guides a rotation of the hinge member, and
      an angle maintaining structure configured to maintain a position of the hinge member to allow the first housing member and the second housing member to be maintained at a predetermined angle with respect to each other, and
   wherein the angle maintaining structure comprises:
      an elastic pressing portion arranged between the rotation guide and the hinge member, the elastic pressing portion extending along a rotation direction of the hinge member, and being elastically deformable, and
      at least one position maintaining groove into which a portion of the elastic pressing portion is insertable and which is disposed in a surface of the hinge member facing the rotation guide.

2. The foldable electronic apparatus of claim 1, wherein the angle maintaining structure is further configured to maintain a position of the hinge member so as to allow the first housing member and the second housing member to be maintained at an angle greater than 0 degree and less than 180 degrees.

3. The foldable electronic apparatus of claim 2, wherein the elastic pressing portion comprises:
   a position maintaining protrusion which is insertable into the position maintaining groove; and an elastic portion supporting the position maintaining protrusion and providing an elastic force so that the position maintaining protrusion is inserted into the position maintaining groove.

4. The foldable electronic apparatus of claim 3, wherein a height of the position maintaining protrusion is less than or equal to a depth of the position maintaining groove.

5. The foldable electronic apparatus of claim 3, wherein a sliding groove into which the position maintaining protrusion is insertable and which extends along a rotation direction is disposed in one side of the position maintaining groove in the hinge member.

6. The foldable electronic apparatus of claim 5, wherein a depth of the sliding groove is greater than or equal to a depth of the position maintaining groove.

7. The foldable electronic apparatus of claim 3, wherein the elastic portion comprises:
a fixing portion fixed to the rotation guide; and
a deformation portion supporting the position maintaining protrusion, having a length extending along a rotation direction of the hinge member, and being elastically deformed in a direction perpendicular to a lengthwise direction.

8. The foldable electronic apparatus of claim 7, wherein the elastic portion further comprises a plurality of support portions for supporting the deformation portion to be spaced apart from the rotation guide by a predetermined interval.

9. The foldable electronic apparatus of claim 8,
wherein the elastic portion further comprises a plurality of auxiliary support portions arranged between the plurality of support portions at opposite sides of the position maintaining protrusion, and
wherein the plurality of auxiliary support portions includes a height less than the heights of the plurality of support portions.

10. The foldable electronic apparatus of claim 9, wherein the deformation portion further comprises a pair of slits formed between the position maintaining protrusion and the plurality of auxiliary support portions.

11. The foldable electronic apparatus of claim 7,
wherein the deformation portion extends from the fixing portion, and
wherein the deformation portion comprises a structure in which a distance from a surface of the rotation guide increases as the deformation portion approaches the position maintaining protrusion.

12. The foldable electronic apparatus of claim 3, wherein the position maintaining protrusion comprises a material identical to a material of the elastic portion.

13. The foldable electronic apparatus of claim 3, wherein the position maintaining protrusion comprises a material different from a material of the elastic portion.

14. The foldable electronic apparatus of claim 1, wherein the hinge member includes a sliding rotation portion having a shape corresponding to a shape of the rotation guide.

15. The foldable electronic apparatus of claim 3, wherein the position maintaining protrusion includes a hemispheric shape.

16. The foldable electronic apparatus of claim 3, wherein the position maintaining protrusion includes a semicircular shape having a smooth curve along a rotation direction of the hinge member.

17. The foldable electronic apparatus of claim 3, wherein the position maintaining protrusion includes a shape that accommodates a space in the position maintaining protrusion.

* * * * *